(12) United States Patent
Suzuki et al.

(10) Patent No.: US 6,606,179 B2
(45) Date of Patent: Aug. 12, 2003

(54) OPTICAL SCANNING DEVICE, LINE-IMAGE FORMING OPTICAL SYSTEM THEREIN, IMAGING ADJUSTMENT METHOD IN THE DEVICE AND IMAGE FORMING APPARATUS

(75) Inventors: Seizo Suzuki, Kanagawa (JP); Magane Aoki, Kanagawa (JP); Hiromichi Atsuumi, Kanagawa (JP); Kohji Sakai, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/279,848

(22) Filed: Oct. 25, 2002

(65) Prior Publication Data

US 2003/0063355 A1 Apr. 3, 2003

Related U.S. Application Data

(62) Division of application No. 09/653,330, filed on Aug. 31, 2000, now Pat. No. 6,509,995.

(30) Foreign Application Priority Data

Sep. 1, 1999 (JP) ............................................ 11-247540
Apr. 20, 2000 (JP) ....................................... 2000-119609

(51) Int. Cl.⁷ .............................................. G02B 26/08
(52) U.S. Cl. ........................ 359/196; 359/212; 359/216; 347/259
(58) Field of Search ................................ 359/196–226, 359/867, 869, 726–728; 347/256–261

(56) References Cited

U.S. PATENT DOCUMENTS

| 5,233,454 A | 8/1993 | Sakuma et al. |
| 5,270,851 A | 12/1993 | Makino et al. |
| 5,355,244 A | 10/1994 | Suzuki et al. |
| 5,408,095 A | 4/1995 | Atsuumi et al. |
| 5,426,298 A | 6/1995 | Sakuma et al. |
| 5,459,601 A | 10/1995 | Suzuki et al. |
| 5,475,522 A | 12/1995 | Itabashi et al. |
| 5,504,613 A | 4/1996 | Itabashi et al. |
| 5,546,216 A | 8/1996 | Suzuki |
| 5,557,448 A | 9/1996 | Endo et al. |
| 5,570,224 A | 10/1996 | Endo et al. |
| 5,581,392 A | 12/1996 | Hayashi |
| 5,633,744 A | 5/1997 | Nakajima |
| 5,652,670 A | 7/1997 | Hayashi |
| 5,684,618 A | 11/1997 | Atsuumi |

(List continued on next page.)

FOREIGN PATENT DOCUMENTS

| JP | 8-160330 | 6/1996 |
| JP | 8-292388 | 11/1996 |
| JP | 10-020225 | 1/1998 |
| JP | 2761723 | 3/1998 |
| JP | 2804647 | 7/1998 |

Primary Examiner—James Phan
(74) Attorney, Agent, or Firm—Oblon, Spivak, McClelland, Maier & Neustadt, P.C.

(57) ABSTRACT

A light source emitting a light flux; a coupling optical system couples the light flux from the light source to a subsequent optical system by transforming it into a parallel light flux, an approximately convergent light flux or an approximately divergent light flux; a light deflector reflects the light flux from the coupling optical system with a deflection reflective surface, and deflects it; a scanning and imaging optical system condenses the deflected light flux from the light deflector onto a surface to be scanned as a beam spot; and a correcting optical system is provided for self correcting shift of focal position of the beam spot on the surface to be scanned occurring due to environmental change or the like. The correcting optical system comprises at least one pair of a resin-made lens having an anamorphic surface having a negative power in each of main scanning direction and sub-scanning direction and a glass-made lens having an anamorphic surface having a positive power at least in sub-scanning direction, and is disposed between the coupling optical system and deflection reflective surface.

10 Claims, 15 Drawing Sheets

U.S. PATENT DOCUMENTS

| | | |
|---|---|---|
| 5,717,511 A | 2/1998 | Suzuki |
| 5,753,907 A | 5/1998 | Nakajima et al. |
| 5,786,594 A | 7/1998 | Ito et al. |
| 5,793,408 A | 8/1998 | Nakajima |
| 5,875,051 A | 2/1999 | Suzuki et al. |
| 5,936,756 A | 8/1999 | Nakajima |
| 5,986,791 A | 11/1999 | Suzuki et al. |
| 5,999,345 A | 12/1999 | Nakajima et al. |
| 6,052,211 A | 4/2000 | Nakajima |
| 6,069,724 A | 5/2000 | Hayashi et al. |
| 6,078,419 A | 6/2000 | Atsuumi |
| 6,081,386 A | 6/2000 | Hayashi et al. |
| 6,091,534 A | 7/2000 | Nakajima |
| 6,104,522 A | 8/2000 | Hayashi et al. |
| 6,141,133 A | 10/2000 | Suzuki et al. |
| 6,185,026 B1 | 2/2001 | Hayashi et al. |
| 6,198,562 B1 | 3/2001 | Hayashi et al. |
| 6,198,563 B1 | 3/2001 | Atsuumi |
| 6,222,662 B1 | 4/2001 | Suzuki et al. |
| 6,229,638 B1 | 5/2001 | Sakai et al. |
| 6,233,081 B1 | 5/2001 | Suzuki et al. |
| 6,256,133 B1 | 7/2001 | Suzuki et al. |
| 6,347,004 B1 | 2/2002 | Suzuki et al. |
| 6,359,717 B2 | 3/2002 | Suzuki et al. |

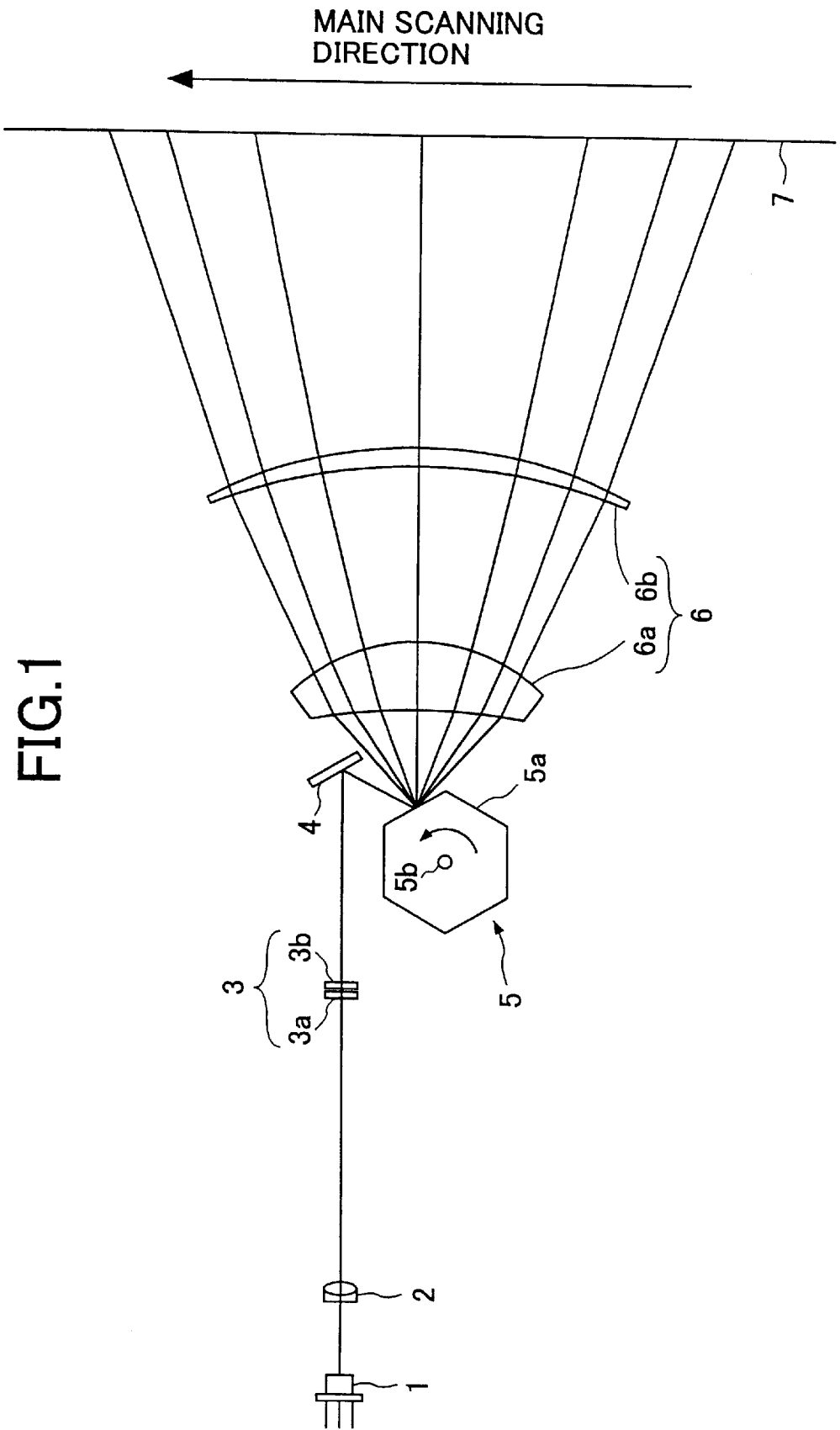

CURVATURE OF FIELD

UNIFORM-VELOCITY
CHARACTERISTICS

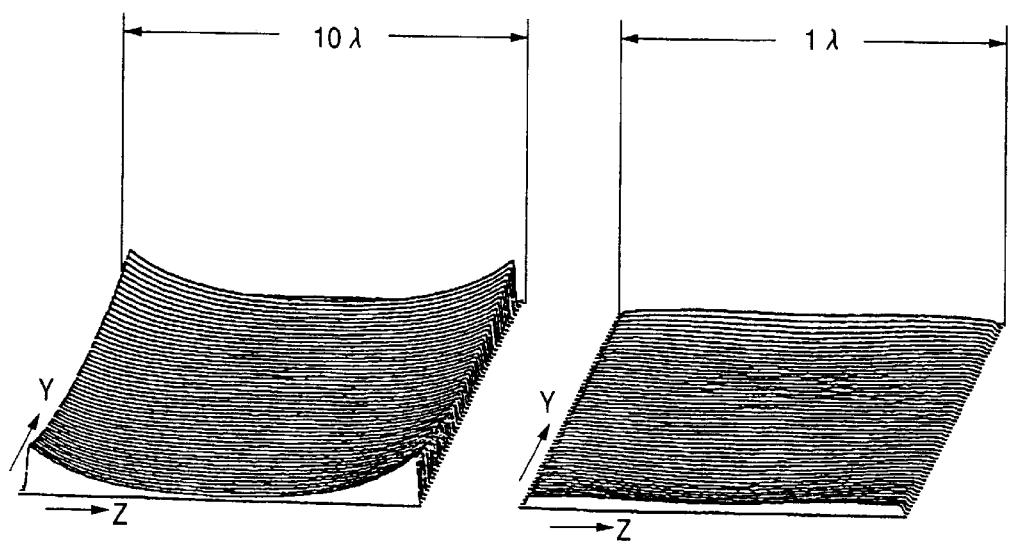

FIG.6

| CASE | | T \ h | h=150 | h=122.7 | h=76.7 | h=0 | h=-76.7 | h=122.7 | h=150 | IMAGE SURFACE SHIFT RANGE |
|---|---|---|---|---|---|---|---|---|---|---|
| NO TEMPERTURE CANCELLATION CASE | MAIN SCANNING | 10°C | -1.04 | -1.01 | -1.07 | -1.13 | -1.07 | -1.01 | -1.02 | 2.37 |
| | | 45°C | 1.15 | 1.12 | 1.18 | 1.24 | 1.18 | 1.12 | 1.13 | |
| | SUB-SCANNING | 10°C | -1.24 | -1.31 | -1.28 | -1.24 | -1.27 | -1.30 | -1.27 | 2.79 |
| | | 45°C | 1.36 | 1.48 | 1.46 | 1.42 | 1.45 | 1.46 | 1.35 | |
| TEMPERATURE CANCELLATION CASE | MAIN SCANNING | 10°C | -0.22 | -1.16 | -0.14 | 0.13 | -0.14 | -0.16 | -0.22 | 0.46 |
| | | 45°C | 0.24 | 0.16 | 0.14 | -0.11 | 0.14 | 0.16 | 0.23 | |
| | SUB-SCANNING | 10°C | -0.18 | -0.23 | -0.18 | 0.21 | -0.17 | -0.23 | -0.18 | 0.56 |
| | | 45°C | 0.23 | 0.33 | 0.28 | | 0.28 | 0.32 | 0.23 | |

IMAGE SURFACE SHIFT AMOUNT (mm)

h : IMAGE HEIGHT , T : TEMPERATURE

------ : MAINSCANNING
——— : SUB-SCANNING

WRITING WIDTH: ±161.5mm

OPTICAL SCANNING DEVICE, LINE-IMAGE FORMING OPTICAL SYSTEM THEREIN, IMAGING ADJUSTMENT METHOD IN THE DEVICE AND IMAGE FORMING APPARATUS

This application is a division of application Ser. No. 09/653,330, filed on Aug. 31, 2000, now U.S. Pat. No. 6,509,995.

BACKGROUND OF THE INVENTION

1. Field of the Invention

The present invention generally relates to an optical scanning device used in a writing optical system of an image forming apparatus such as a laser printer, a digital copier, a facsimile machine or the like, a measurement apparatus, an inspection apparatus or the like, and to a line-image forming optical system used in an optical scanning device, an imaging adjustment method used in the optical scanning device and an image forming apparatus.

2. Description of the Related Art

An optical scanning device deflecting a light flux from a light source, condensing the light flux onto a surface to be scanned as a beam spot through a scanning optical system and scanning the surface to be scanned has been well-known in connection with a laser printer, a digital copier, a facsimile machine, and so forth. In such an optical scanning device, in order to reduce a lens cost and/or in order to achieve a special lens surface shape, a resin-made lens (meaning a lens made of resin, through the specification and claims) is used. Especially, various shapes of lens surface have been proposed for a scanning and imaging lens of a scanning and imaging optical system causing a deflected light flux to form an image on a surface to be scanned, in order to well correct curvature of field and uniform-velocity characteristics such as a linearity, and, a resin-made lens is suitable for achieving such a special lens surface shape.

However, as well-known, a resin-made lens involves a problem in that, a change in volume due to a change in temperature causes a curvature and/or refractive index of the lens to change, and a lens performance, in particular, a position of focus on a surface to be scanned to change. Such a change in position of focus results in increase of a spot diameter of a beam spot on a surface to be scanned, and degradation of resolution in optical scanning.

In this regard, because a change in position of focus due to a change in temperature of resin-made lenses occurs in a positive lens and a negative lens reversely to one another, it has been proposed to cancel a change in position of focus of a resin-made scanning and imaging lens due to a change in temperature by disposing a resin-made lens having a power reverse to that of the resin-made scanning and imaging lens on a light path from a light source to a light deflector (see Japanese Laid-Open Patent Application No. 8-160330 and Japanese Laid-Open Patent Application No. 8-292388).

An optical scanning device disclosed in Japanese Laid-Open Patent Application No. 8-160330 includes a light source, a deflector, an entrance optical system, a scanning optical system, and a medium to be scanned. The entrance optical system includes a first optical system (collimator lens) transforming a divergent light flux from the light source into a parallel light flux, and a second optical system condensing the light flux from the first optical system in sub-scanning direction so as to cause the light flux to form an image on or in the proximity of the deflector. Either one of the first and second optical system includes a resin-made optical component (lens) having a negative power in sub-scanning direction.

A scanning optical device disclosed in Japanese Laid-Open Patent Application No. 8-292388 has a negative lens having a negative refracting power only in sub-scanning direction and made of resin in a first imaging part forming an image on or in the proximity of a deflection position of a deflector, and performs temperature compensation.

However, in such an optical scanning device, a resin-made lens disposed between the light source and deflector for the correction has a negative power only in sub-scanning direction and no power in main scanning direction. Accordingly, it is not possible to correct a shift in focus position (shift in imaging position of a beam spot) in main scanning direction due to a change in temperature of a scanning and imaging lens.

Further, a lens for the correction in the related art has an ordinary arc-shape lens section. Accordingly, wavefront aberration is increased by the lens for the correction, and, thereby, achievement of a small-diameter beam spot is obstructed.

An optical scanning device 'transforms a beam (denoting an 'optical beam' through the specification and claims) from a light source into a beam having a predetermined beam style by a coupling optical system, causes this beam to form a line image long in main scanning direction by a line-image forming optical system, deflects the beam by a light deflector having a deflection reflective surface at or in the proximity of the imaging position of this line image, condenses the deflected beam toward a surface to be scanned by a scanning and imaging optical system, forms a beam spot on the surface to be scanned, and scans the surface to be scanned'. By thus causing a beam from the light source to form a line image long in main scanning direction on or in the proximity of the deflection reflective surface of the light deflector', it is possible to correct so-called 'surface inclination' of the light deflector.

Recently, increase in image density has been demanded in a digital copier and/or a laser printer, and reduction in diameter of beam spot formed on a surface to be scanned is demanded. Further, as mentioned above, making a lens from resin in the scanning and imaging optical system has been performed progressively in order to reduce costs and/or to achieve 'special surface shape' needed to reduce diameter of beam spot.

A beam spot is formed as a result of a deflected beam deflected by the light deflector being condensed toward the surface to be scanned by the scanning and imaging optical system. Ideally, the beam spot is formed by a beam waist of the condensed deflected beam. In the optical scanning device having the above-described configuration, the scanning and imaging optical system is an 'anamorphic optical system such that power thereof is different between main scanning direction and sub-scanning direction'. Accordingly, generally, the position of beam waist of the deflected beam in main scanning direction does not completely coincide with the position of beam waist of the deflected beam in sub-scanning direction.

An image surface in main scanning direction and sub-scanning direction is obtained from a collection the beam-waist positions in main scanning direction and sub-scanning direction. The image surface is curved in accordance with curvature of field of the optical system.

In order to achieve satisfactory optical scanning with 'a beam spot having a diameter small in both main scanning direction and sub-scanning direction', it is necessary that the beam-waist positions in main scanning direction and sub-scanning direction substantially coincide with the surface to be scanned 'whatever the position in main scanning direction (image height)', that is, the image surface in main scanning direction and sub-scanning direction substantially coincides with the surface to be scanned. In order to satisfy this condition, optical design is made so as to well correct curvature of field in main scanning direction and sub-scanning direction.

However, although a satisfactory result is obtained on design, optical characteristics on design are not actually achieved. For example, when an fθ lens which is generally used as the scanning and imaging optical system includes working errors and/or assembly errors, an actual image-surface position of a deflected beam is different from the surface to be scanned. As a result, the diameter of the beam spot is larger than the designed amount.

It is possible to form a beam spot substantially having a spot diameter in accordance with design on the surface to be scanned by making an fθ lens or the like 'substantially in accordance with design' and assembling it with high accuracy. However, when the fθ lens includes a 'resin-made lens', a change in refractive index and/or a change in shape of the resin-made lens' occurs when the temperature of the optical scanning device changes, and, thereby, a 'shift of image surface' in that the image surface shifts from the surface to be scanned occurs, and the spot diameter increases.

Further, when a metal holding device holding the coupling optical system expands or shrinks due to that temperature change, a minute distance between the light source and coupling optical system changes, and, thereby, the coupling function changes, and the spot diameter increases.

A direction of shift of image surface (direction in which the image surface moves) due to 'temperature change' of a resin-made lens is reverse for the lens having a positive power to that for the lens having a negative power. Accordingly, by providing a 'resin-made lens having a power reverse to that of a resin-made lens of fθ lens' on a light path from the light source up to the light deflector, and adjusting the powers of the lenses, it is possible to cancel the shift of image surface due to temperature change (as disclosed in Japanese Laid-Open Patent Application No. 8-292388 and Japanese Patent No. 2804647).

As mentioned above, in the method disclosed in Japanese Laid-Open Patent Application No. 8-292388, a resin-made lens disposed between a light source and a light deflector 'does not have power in main scanning direction'. Accordingly, this lens does not have a function of correcting of shift of image surface in main scanning direction due to temperature change. Therefore, it is not possible to prevent a spot diameter from increasing in main scanning direction.

Further, in all the embodiments disclosed in Japanese Laid-Open Patent Application No. 8-292388, a 'resin-made lens having a negative power' is a cylindrical plane-concave lens. However, the radius of curvature thereof is 5 through 8 mm, that is, very small. Therefore, high accuracy is demanded for working and assembly of the lens. This is because the function of correction coping with temperature change is performed by 'only one surface' of the lens.

According to the Japanese Patent No. 2804647, a resin-made lens having power 'having an absolute value equal to and a sign reverse to' those of power of a resin-made lens included in a scanning and imaging lens is used and shift of image surface in main scanning direction is corrected, and, the position of the scanning and imaging optical system is controlled and shift of image surface in sub-scanning direction is controlled to a level such as not to cause problems. By this method, it is possible to effectively reduce 'shift of image surface due to temperature change' in both main scanning direction and sub-scanning direction'. However, an arrangement of the scanning and imaging optical system is limited. Accordingly, flexibility in optical design of the optical scanning device is remarkably limited.

Further, Japanese Laid-Open Patent Application No. 10-20225 and Japanese Patent No. 2761723 disclose a method of mechanically moving collimator lens and so forth in optical-axis direction, and correcting shift of image surface. However, in this method, extra mechanical components, 'components for detecting that the imaging position is shifted' and so forth are needed. Therefore, costs increase, and power consumption increases.

SUMMARY OF THE INVENTION

The present invention has been devised in consideration of the above-described circumstances, and an object of the present invention is to provide an optical scanning device which can form a small-diameter beam spot on a surface to be scanned whatever temperature change, by self correcting shift of focal position in main scanning direction and sub-scanning direction due to change in ambient temperature through all the optical system, even when a resin-made lens is used in an optical system causing a deflected beam to form an image on the surface to be scanned.

Another object of the present invention is to make it possible to correct shift of image surface due to error in working and/or error in assembly of lens in main scanning direction and sub-scanning direction independently.

Another object of the present invention is to effectively reduce shift of image surface due to temperature change in main scanning direction and sub-scanning direction, without using extra mechanical components, with resin-made optical component which is easy to work and/or assemble, without reducing flexibility of design.

An optical scanning device according to the present invention comprises:

a light source emitting a light flux;

a coupling optical system coupling the light flux from the light source to a subsequent optical system by transforming it into a parallel light flux, an approximately convergent light flux or an approximately divergent light flux;

a light deflector reflecting the light flux from the coupling optical system with a deflection reflective surface, and deflecting it;

a scanning and imaging optical system condensing the deflected light flux from the light deflector onto a surface to be scanned as a beam spot; and a correcting optical system for self correcting shift of focal position of the beam spot on the surface to be scanned occurring due to environmental change or the like, wherein the correcting optical system comprises at least one pair of a resin-made lens having an anamorphic surface having a negative power in each of main scanning direction and sub-scanning direction and a glass-made lens having an anamorphic surface having a positive power at least in sub-scanning direction, and is disposed between the coupling optical system and deflection reflective surface.

Thereby, by suitably determining the temperature dependency of curvature, coefficient of linear expansion, and refractive index of the anamorphic surface of each of the lenses of the correcting optical system for correcting shift of imaging position in main scanning direction and shift of imaging position in sub-scanning direction on the surface to be scanned due to environmental change, it is possible to correct shift of focal position occurring due to change of environment (temperature, humidity) for both main scanning direction and sub-scanning direction. Further, by employing the anamorphic surface, it is possible for each lens to have a plane surface on the reverse side. This plane surface can be used as a reference surface for mounting the lens. Accordingly, it is possible to prevent eccentricity which degrades optical performance from occurring.

It is preferable that the correcting optical system comprising the resin-made lens having the anamorphic surface and glass-made lens having the anamorphic surface is integrally held by a holding member.

Thereby, it is possible to control, previously at a time of assembling adjustment, wavefront aberration occurring in the correcting optical system It is preferable that a configuration is provided such that the correcting optical system integrated by the holding member can be moved in direction of optical axis.

Thereby, when assembling the correcting optical system in an optical system unit, it is possible to perform adjustment such as to prevent shift of focal position previously.

It is preferable that a configuration is provided such that the correcting optical system integrated by the holding member can be rotated about optical axis.

Thereby, it is possible to adjust the entirety of the optical system while keeping the wavefront aberration in the correcting optical system smaller.

It is preferable that at least one surface of the anamorphic surfaces of the correcting optical system comprises an aspherical surface in each of main and sub-scanning directions.

Thereby, it is possible to well correct the wavefront aberration.

It is preferable that, when L denotes a surface separation between the resin-made lens having the anamorphic surface and the glass-made lens having the anamorphic surface and fs denotes a focal length of the entirety of the correcting optical system, the following condition is satisfied:

$$0<L/fs<0.1$$

Thereby, it is possible to well correct the wavefront aberration and to obtain a small-diameter beam spot.

An imaging adjustment method in an optical scanning device according to the present invention is a method of performing adjustment of imaging of deflected beam in an optical scanning device through which a beam in a predetermined style from the side of a light source is caused to form a line image long in main scanning direction by a line-image forming optical system, then, is deflected by a light deflector having a deflection reflective surface on or in the proximity of the imaging position of the line image, the deflected beam is condensed toward a surface to be scanned by a scanning and imaging optical system, a beam spot is formed on the surface to be scanned, and optical scanning of the surface to be scanned is performed, and has the following features:

The line-image forming optical system is configured to have a plurality of optical components, these optical components are configured to include a plurality of surfaces each having a negative power in sub-scanning direction and a surface having a negative power in main scanning direction.

The positional relationship of the optical component having the surface(s) having the negative power in main scanning direction and the other optical component having the surface(s) having the negative power in sub-scanning direction with the light-source-side optical system (light source and coupling optical system) and/or scanning and imaging optical system is adjusted independently for the above-mentioned optical component and the above-mentioned other optical component. Thereby, the beam-waist positions in main scanning direction and sub-scanning direction are adjusted with respect to the position or the surface to be scanned.

The relative positional relationship between the above-mentioned optical component having the surface(s) having the negative power in main scanning direction and the light-source-side optical system and/or scanning and imaging optical system is adjusted, as mentioned above. Thereby, it is possible to adjust the position of image surface in main scanning direction with respect to the surface to be scanned. Further, the relative positional relationship between the above-mentioned other optical component having the surface(s) having the negative power in sub-scanning direction and the light-source-side optical system and/or scanning and imaging optical system is adjusted, as mentioned above. Thereby, it is possible to adjust the position of image surface in sub-scanning direction with respect to the surface to be scanned.

This imaging adjustment method is a method of adjusting so as to correct shift of image surface occurring due to working errors and/or assembly errors. Accordingly, this method can be performed whether or not the line-image forming optical system and/or scanning and imaging optical system includes resin-made optical components. When optical components of the line-image forming optical system are to be moved in the relative positional adjustment of the above-mentioned optical component and/or the above-mentioned other optical component, it is not necessary to use a special mechanism. It is sufficient that a suitable jig is used and the movement is made, and, then, after the adjustment, the optical components are fixed using adhesive or the like.

A line-image forming optical system according to the present invention is a line-image forming optical system in an optical scanning device through which a beam from a light source is transformed into a beam in a predetermined style by a coupling optical system, the beam is caused to form a line image long in main scanning direction by the line-image forming optical system, then, is deflected by a light deflector having a deflection reflective surface on or in the proximity of the imaging position of the line image, the deflected beam is condensed toward a surface to be scanned by a scanning and imaging optical system, a beam spot is formed on said surface to be scanned, and optical scanning of said surface to be scanned is performed.

The line-image forming optical system comprises at least one resin-made lens and at least one glass-made lens;

the at least one resin-made lens includes at least two surfaces each having a negative power in sub-scanning direction and at least one surface each having a negative power in main scanning direction; and the powers of respective surfaces of the at least one resin-made lens are set so that shift of image surface occurring due to temperature change of the coupling optical system and/or scanning and imaging optical system is effectively reduced.

Alternatively, the above-mentioned line-image forming optical system comprises at least one resin-made imaging mirror and at least one glass-made lens;

the at least one resin-made imaging mirror has at least one surface having a negative power in main scanning direction and a larger negative power in sub-scanning direction; and the powers of the surface of the at least one resin-made imaging mirror are set so that shift of image surface occurring due to temperature change of the coupling optical system and/or scanning and imaging optical system is effectively reduced.

Alternatively, the above-mentioned comprises at least one resin-made imaging mirror, at least one resin-made lens, and at least one glass-made lens;

the at least one resin-made imaging mirror has at least one surface having a negative power at least in sub-scanning direction;

the at least one resin-made lens has at least one surface having a negative power at least in sub-scanning direction;

a system consisting of these resin-made imaging mirror and resin-made lens has at least one surface having a negative power in main scanning direction; and the powers of respective surfaces of at least one resin-made imaging mirror and at least one resin-made lens are set so that shift of image surface occurring due to temperature change of the coupling optical system and/or scanning and imaging optical system is effectively reduced.

Thus, each of the these line-image forming optical systems effectively reduces shift of image surface occurring due to temperature change of the coupling optical system and/or scanning and imaging optical system. The shift of image surface due to temperature of the coupling optical system is shift of image surface occurring due to a slight change of the distance between the coupling optical system and light source due to expansion or shrinkage of a metal holder holding the coupling optical system and/or a change of optical characteristics due to temperature change of a resin-made optical component when the coupling optical system includes the resin-made optical component as described above. This shift of image surface may occur when the scanning and imaging optical system does not include optical components made of resin.

The shift of image surface due to temperature change of the scanning and imaging optical system is shift of image surface occurring due to a change of optical characteristics due to temperature change of a resin-made optical component when the scanning and imaging optical system includes the resin-made optical component When the scanning and imaging optical system includes a resin-made optical component, the line-image forming optical system may comprise two resin-made lenses and a glass-made lens;

the two resin-made lenses including three surfaces each having a negative power in sub-scanning direction, and a surface having a negative power in main scanning direction; and the powers of respective surfaces of the two resin-made lenses being set so that shift of image surface occurring due to temperature change of the resin-made optical component included in the scanning and imaging optical system is effectively reduced.

In each of the above-described line-image forming optical systems, the powers of the surfaces having the negative powers in sub-scanning direction included in the resin-made optical components (resin-made imaging mirror and/or resin-made lens) may be set to be approximately equal to each other.

Each of the above-mentioned line-image forming optical system can effectively reduce for main and sub-scanning directions shift of image surface occurring due to temperature change by canceling it out by shift of image surface occurring due to change of characteristics due to temperature change of resin-made optical components.

As described above, a large negative power in sub-scanning direction is needed for correcting shift of image surface in sub-scanning direction. However, by configuring the resin-made lens(es) to include the plurality of surfaces each having the negative power in sub-scanning direction, it is possible to distribute the negative power in sub-scanning direction required for correcting the shift of image surface among the plurality of lens surfaces. Thereby, it is possible to reduce the negative power of each lens surface, to effectively prevent the radius of curvature of the lens surface in sub-scanning direction from being so reduced, and to ease manufacture and assembly of the resin-made lens.

Further, when the resin-made imaging mirror is used, because the negative power of resin-made imaging mirror can be achieved by a curvature smaller in comparison to a case where refraction in a lens surface is used. Accordingly, a radius of curvature of the resin-made imaging mirror may be enlarged. Therefore, it is possible to achieve correction of shift of image surface only by a single resin-made imaging mirror, while manufacture and assembly of the resin-made imaging mirror is easy.

An optical scanning device according to the present invention is an optical scanning device through which a beam in a predetermined style from a side of a light source is caused to form a line image long in main scanning direction by a line-image forming optical system, then, is deflected by a light deflector having a deflection reflective surface on or in the proximity of the imaging position of the line image, the deflected beam is condensed toward a surface to be scanned by a scanning and imaging optical system, a beam spot is formed on the surface to be scanned, and optical scanning of the surface to be scanned is performed.

In the optical scanning device, any of the above described line-image forming optical systems can be used as the line-image forming optical system of the optical scanning device.

In the above-description, any one of various gas lasers, solid lasers, semiconductor lasers, LEDs can be used as the light source. Further, the optical scanning device may be not only of a so-called single-beam type but also of a multi-beam type. In this case, a beam combining type light source device performing beam combination of beams from semiconductor laser array or a plurality of light sources by a prism can be used as the light source of the optical scanning device. Further, a rotational single-surface mirror, rotational bi-surface mirror, a rotational polygon mirror, or a galvano-mirror may be used as the light deflector having the deflection reflective surface.

An image forming apparatus according to the present invention is an 'image forming apparatus forming an electrostatic latent image on a latent-image carrying body through optical scanning, visualizing the formed electrostatic latent image, and obtaining a desired recorded image'.

Any of the above-described optical scanning devices may be used as an optical scanning device performing the optical scanning of the latent-image carrying body of the image forming apparatus according to the present invention.

In this case, a photoconductive photosensitive body may be used as the latent-image carrying body, the electrostatic latent image may be formed on a photosensitive surface thereof through uniform charging and the optical scanning thereof, and the thus-formed electrostatic latent image may be visualized as a toner image. The toner image is fixed onto a sheet-like recording medium (transfer paper, plastic sheet for an overhead projector(OHP sheet), or the like).

In the image forming apparatus, a film for photography with silver halide may be used as the image carrying body, for example. In this case, the electrostatic latent image formed through the optical scanning by the optical scanning device is visualized by a 'method of developing in an ordinary process of photography with silver halide'. Such an image forming apparatus may be embodied as an optical plate-making system, an optical drawing system, or the like.

The image forming apparatus according to the present invention may also be embodied as a laser printer, a laser plotter, a digital copier, a facsimile machine, or the like.

Thus, as described above, according to the present invention, novel optical scanning device, line-image forming optical system in the optical scanning device, imaging adjustment method for the optical scanning device and image forming apparatus can be achieved.

By using a line-image forming optical system according to the present invention, it is possible to effectively reduce for main and sub-scanning directions shift of image surface occurring due to temperature change of optical components made of resin included in the optical scanning device, without using an extra mechanical configuration, without reducing flexibility of design, using resin-made optical components which are easy to manufacture and assemble. Accordingly, an optical scanning device using this line-image forming optical system can effectively prevent a spot diameter from increasing and to achieve satisfactory optical scanning, whatever the temperature change, within a practical range of temperature change.

Further, by the imaging adjustment method according to the present invention, it is possible to adjust the beam-waist positions in main scanning direction and sub-scanning direction of the deflected beam, which may shift due to working errors of optical component such as fθ lens or the like, mutually independently for the main and sub-scanning directions with respect to the surface to be scanned. Then, when the optical components of the line-image forming optical system are fixed after the adjustment, the beam-waist positions in main and sub-scanning directions well coincide with the surface to be scanned. Thereby, it is possible to achieve satisfactory optical scanning.

Further, an image forming apparatus according to the present invention can achieve satisfactory image formation whatever temperature change by using the above-mentioned optical scanning device.

Other objects and further features of the present invention will become more apparent from the following detailed description when read in conjunction with the accompanying drawings.

BRIEF DESCRIPTION OF THE DRAWINGS

FIG. 1 shows a first embodiment of the present invention, and, illustrates an optical configuration of an optical scanning device in the first embodiment by expanding it in a main scanning plane;

FIG. 2B showing the light path expanded in a plane in sub-scanning direction);

FIGS. 5A and 5B show wavefront aberration when a toroidal surface is used in an anamorphic surface of the correcting optical system and when a special toroidal surface is used in the anamorphic surface of the correcting optical system in the embodiment shown in FIG. 1;

FIG. 6 illustrates an effect of temperature correction by the correcting optical system of the optical scanning device in the first embodiment;

DETAILED DESCRIPTION OF THE PREFERRED EMBODIMENTS

Figure 2A:
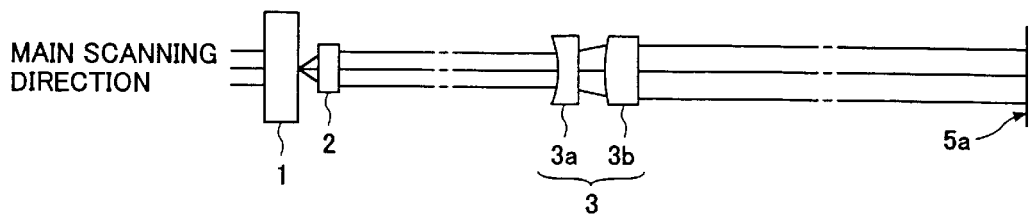
FIGS. 2A and 2B illustrate an optical configuration on a light path of the optical scanning device shown in FIG. 1 from a light source up to a deflection reflective surface (FIG. 2A showing the light path expanded in a plane in main scanning direction.

FIG. 1 shows a first embodiment of the present invention, and, illustrates an optical configuration of an optical scanning device in the first embodiment by expanding it in a main scanning plane (plane parallel to optical axis and also to main scanning direction). The optical system shown in FIG. 1 includes a light source 1, a coupling optical system 2 coupling a light flux from the light source 1 to the subsequent optical system by transforming the light flux into a parallel light flux, an approximately convergent light flux or an approximately divergent light flux, a light deflector 5 performing deflection scanning by reflecting the light flux from the coupling optical system 2 with a deflection reflective surface 5a, a scanning and imaging optical system 6 condensing the deflected light flux from the light deflector 5 onto a surface 7 to be scanned as a beam spot, and a correcting optical system 3 self correcting shift of focal position of the beam spot on the surface 7 to be scanned occurring due to environmental change or the like. The correcting optical system 3 includes at least one pair of a resin-made correction lens 3a having an anamorphic surface having a negative power in each of both main scanning direction and sub-scanning direction and a glass-made (meaning 'made of glass', through the specification and claims) correction lens 3b having an anamorphic surface having a positive power at least in sub-scanning direction, and is disposed between the coupling optical system 2 and deflection reflective surface 5a. A plane mirror 4 is used for bending a light path, and is provided as necessity arises.

A semiconductor laser is used as the light source 1. However, instead, a light emitting diode (LED) or the like may be used.

The coupling optical system 2 is a coupling lens including a single lens or a plurality of lenses, and couples a divergent light flux from the light source 1 so as to adapt it to the subsequent optical system (correcting optical system) by transforming it into a parallel light flux, an approximately convergent light flux or an approximately divergent light flux. The coupling lens 2 is either made of resin or made of glass. However, it is preferable to use a glass-made lens which is not likely to be affected by environmental change such as temperature change. Further, the lens surface(s) thereof may have non-arc shape(s) so as to avoid spherical aberration.

The correcting optical system 3 has a function of correcting shift of focal position occurring due to environmental change (temperature, humidity change) in both main scanning direction and sub-scanning direction (as will be described in detail later). However, it has a function as a line-image forming optical system, and, as shown in FIG. 2A which shows a light path expanded in a plane in main scanning direction and FIG. 2B which shows the light path expanded in a plane in sub-scanning direction, converges a light flux from the coupling lens 2 in sub-scanning direction (direction perpendicular to the plane of FIG. 1), and forms a line image long in main scanning direction on or in the proximity of the deflection reflective surface 5a of the light deflector 5.

The light deflector 5 is a polygon mirror which rotates at a uniform velocity around the rotational shaft 5b of a motor, and deflects a light flux reflected by the deflection reflective surface 5a at a uniform angular velocity through the uniform-velocity rotation of the polygon mirror. Instead of the polygon mirror, a rotational mono-surface mirror, a rotational bi-surface mirror or the like may be used.

The scanning and imaging optical system 6 includes two scanning lenses 6a and 6b in the example shown in FIG. 1, and, by the function of the scanning lenses 6a and 6b, condenses a deflected light flux from the polygon mirror 5 onto the surface 7 to be scanned as a minute beam spot. (In an image forming apparatus such as a laser printer, a digital copier or the like, a photosensitive surface of a photoconductive photosensitive body functions as the surface 7 to be scanned.) Instead of this example, it is also possible that the scanning and imaging optical system 6 includes only a single lens or includes more than two lenses. Alternatively, it is also possible that the scanning and imaging optical system 6 is a combination of at least one lens and a concave mirror or an fθ mirror having an imaging function. Further, when the scanning and imaging optical system 6 consists of two scanning lenses 6a and 6b as shown in FIG. 1, at least one lens of the two scanning lenses 6a and 6b is a resin-made lens having an aspherical lens surface, in order to correct curvature of field in main/sub-scanning directions and/or to improve uniform-velocity characteristics (linearity, fθ characteristics).

Figure 2B:
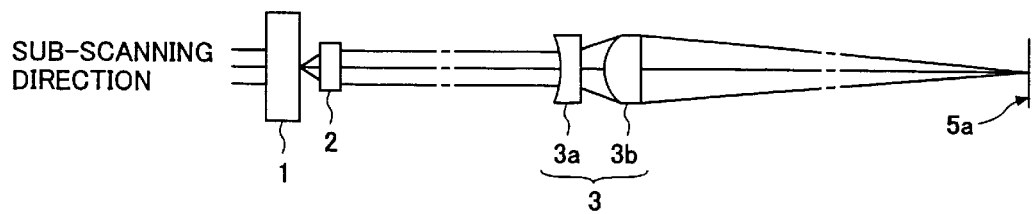

The correcting optical system 3 will now be described in detail. As shown in FIGS. 1, 2A and 2B, the correcting optical system 3 includes a resin-made correction lens 3a having an anamorphic surface having a negative power in each of main scanning direction and sub-scanning direction and a glass-made correction lens 3b having an anamorphic surface (implying a cylindrical surface) having a positive power at least in sub-scanning direction. The temperature dependency of curvature, coefficient of linear expansion, and refractive index of each of the anamorphic surfaces is optimized so as to well correct shift of imaging position in main scanning direction and shift of imaging position in sub-scanning direction on the surface 7 to be scanned occurring due to change in ambient temperature.

As a result of the correction lenses 3a and 3b of the correcting optical system 3 having anamorphic surfaces, the following advantages are obtained:

① It is possible to correct shift of focal position occurring due to environmental (temperature, humidity) change in each of both main scanning direction and sub-scanning direction.

② By employing an anamorphic surface in each of the correction lenses 3a and 3b, it is possible to employ a plane surface reverse to the anamorphic surface which can be used as a reference surface for mounting. Thereby, it is possible to prevent each lens from being mounted eccentrically, and thus prevent the optical performance of the lens from being degraded.

③ Thanks to recent development of cutting and polishing working technique, anamorphic surfaces can be obtained relatively easily through surface working. Accordingly, an anamorphic surface can be achieved without combination of cylindrical surface, spherical surface and so forth, as done traditionally.

Figure 4A:
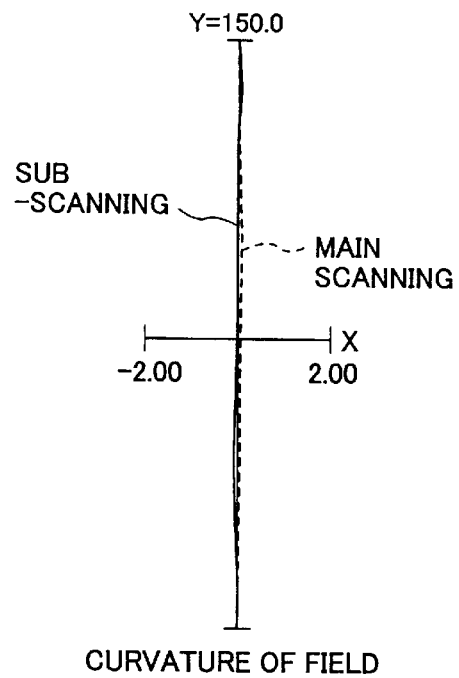
FIGS. 4A and 4B show curvature of field and uniform-velocity characteristics when the optical scanning device in the first embodiment is used.
Figure 4B:
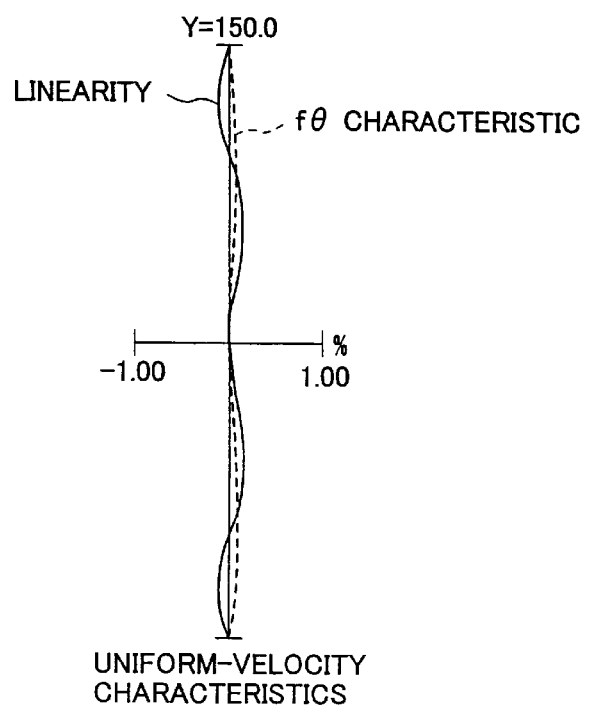

In this embodiment, shift of focal position in the scanning and imaging optical system 6 (scanning lenses 6a and 6b) occurring due to environmental (temperature, humidity) change is self corrected by the correcting optical system 3 precedingly to the deflection reflective surface 5a of the polygon mirror 5. Basically, the correcting optical system 3 does not correct curvature of field itself. Accordingly, it is preferable to previously well correct curvature of field (deviation of focus shift in each scanning) of the scanning and imaging optical system 6. As will be described later, optical performance such as curvature of field and uniform-velocity characteristics (linearity, fθ characteristics) is improved as shown in FIGS. 4A and 4B as a result of the scanning lenses 6a and 6b of the scanning and imaging optical system 6 having anamorphic surfaces (for example, toroidal surfaces and/or special toroidal surfaces) in this embodiment. The special toroidal surface is a toroidal surface in which a curvature in sub-scanning cross section (an imaginary section perpendicular to main scanning direction) varies in main scanning direction.

Figure 3:
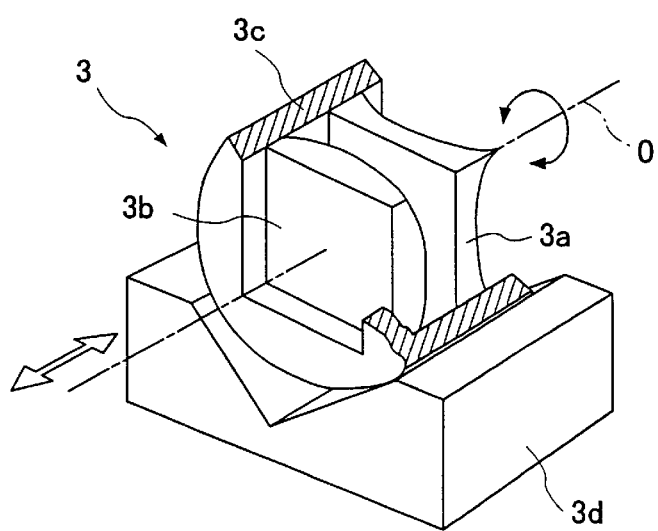
FIG. 3 shows a perspective view of an example of a configuration in which lenses of a correcting optical system of the optical scanning device shown in FIG. 1 are integrated.

In the optical scanning device having the configuration shown in FIGS. 1, 2A and 2B, the resin-made correction lens 3a having the anamorphic surface and glass-made correction lens 3b having the anamorphic surface are preferably held integrally by a holding member. For example, as shown in FIG. 3, a correcting optical system holding unit 3c integrally holds the resin-made correction lens 3a and glass-made correction lens 3b of the correcting optical system 3. Further, the outline of the correcting optical system holding unit 3c is configured to have a cylindrical shape and is set on a pedestal 3d having a V-shaped groove. Thereby, it is possible to provide a configuration such that the correction lenses 3a and 3b integrally held by the correcting optical system holding unit 3c can be moved along the groove so as to be adjusted in direction of optical axis O, or can be rotated in direction perpendicular to optical axis O.

As a result of the correction lenses 3a and 3b of the correcting optical system 3 being integrally held by the holding unit 3c as shown in FIG. 3, the following merits are obtained:

① When there are a plurality of anamorphic surfaces (in this embodiment, two in the correcting optical system and four in the scanning and imaging optical system), rotary eccentricity in surface perpendicular to optical axis causes great wavefront aberration, and results in increase in diameter of beam spot. As a result of the resin-made correction lens 3a and glass-made correction lens 3b of the correcting optical system 3 being integrally held by the optical system holding unit 3c, wavefront aberration occurring in the correcting optical system 3 can be previously prevented at a time of assembly and adjustment thereof.

② As a result of a configuration being provided such that the thus integrated correcting optical system 3 can be moved and thus adjusted in the direction of the optical axis as shown in FIG. 3, shift of focal position in main/sub-scanning directions can be previously adjusted when the correcting optical system 3 is assembled in the optical system holding unit 3c.

③ As a result of a configuration being provided such that the thus integrated correcting optical system 3 can be rotated in direction perpendicular to optical axis as shown in FIG. 3, the entire optical system can be adjusted while warfront aberration in the correcting optical system is kept smaller.

Recently, high-density writing has been demanded in an image forming apparatus such as a laser printer, a digital copier and so forth. High-density writing of higher than 1200 dpi (dots/inch) is being achieved. In order to cope with such a situation, it is necessary to reduce a diameter of beam spot formed on the surface to be scanned. For this purpose, it is necessary to increase NA of the optical system. A light flux passing through a high-NA optical system is large. As a result, wavefront aberration occurring therein largely affects a diameter of beam spot. When the wavefront aberration is too large, it is not possible to reduce the diameter of beam spot satisfactorily.

Therefore, in this embodiment, at least one surface of the anamorphic surfaces of the two correction lenses of the correcting optical system 3 is an aspherical surface in both main and sub-scanning directions. Specifically, the correction lenses 3a and 3b of the correcting optical system 3 has at least one surface of the special toroidal surface having a non-arc shape in main scanning direction or sub-scanning direction. Thereby, it is possible to well correct wavefront aberration. In this embodiment, the correcting optical system thereof being concretely described later, wavefront aberration is well corrected as a result of the convex anamorphic surface of the resin-made lens 3a of the correcting optical system 3 on the light entrance side (the side of coupling lens) being the special toroidal surface.

FIGS. 5A and 5B show wavefront aberration in a case where an ordinary arc-shape toroidal surface is employed in the convex anamorphic surface of the resin-made lens 3a of the correcting optical system 3 on the light entrance side (FIG. 5A) and a case where the special toroidal surface is employed in the same surface (FIG. 5B). As can be seen from the figures, wavefront aberration is well corrected when the special toroidal surface is employed.

An expression determining shapes of the special toroidal surfaces employed in the correction lenses 3a and 3b of the correcting optical system 3 and the scanning lenses 6a and 6b of the scanning and imaging optical system 6 will now be described. However, the present invention of this embodiment is not limited to this expression.

When expressing a lens surface, a coordinate in main scanning direction on and in the proximity of the lens surface is determined as Y, a coordinate in sub-scanning direction on and in the proximity of the lens surface is determined as Z, and the origin of them is determined as optical axis.

Then, a general expression of a lens surface is determined as:

$$f(Y,Z)=fm(Y)+fs(Y,Z)$$

There, a surface shape of the special toroidal surface in main scanning cross section (an imaginary section including optical axis and parallel to main scanning direction) is a non-arc shape, the first term fm(Y) of the right side of the above expression expresses the shape in main scanning cross section, the second term fs(Y,Z) thereof expresses a shape in sub-scanning cross section (an imaginary section perpendicular to main scanning direction) at a position of a coordinate Y in main scanning direction.

The above-mentioned shape in main scanning cross section will now be expressed as a depth X in optical-axis direction by the following polynominal of fm(Y), which is a well-known expression for non-arc shape, using a radius Rm of paraxial curvature in main scanning cross section on optical axis, a distance Y from optical axis in main scanning direction, a conic constant Km, high-order coefficients Am1, Am2, Am3, Am4, Am5, . . .

$$X=f(Y,Z)=fm(Y)+fs(Y,Z) \tag{1}$$

$$fm(Y) = (Y^2/Rm)/\left[1 + \sqrt{\{1-(1+Km)(Y/Rm)^2\}}\right] + Am1 \cdot Y + \tag{2}$$
$$Am2 \cdot Y^2 + Am3 \cdot Y^3 + Am4 \cdot Y^4 + Am5 \cdot Y^5 + \ldots$$

In the expression (2), when any of the odd-order coefficients Am1, Am3, Am5, . . . is not 0, the non-arc shape is an asymmetrical shape in main scanning direction. When only the even-order coefficients Am2, Am4, Am6, . . . remain, the non-arc shape is symmetrical in main scanning direction.

In the above expression, 'Y^2' denotes '$Y^2$', 'Y^3' denotes '$Y^3$', for example.

Further, the above-mentioned fs(Y,Z) is expressed as follows:

$$fs(Y,Z) = (Z^2 \cdot Cs)/\left[1 + \sqrt{\{1-(1+Ks)(Z \cdot Cs)^2\}}\right] + \tag{3}$$
$$(F0+F1 \cdot Y + F2 \cdot Y^2 +$$
$$F3 \cdot Y^3 + F4 \cdot Y^4 + \ldots) \cdot Z +$$
$$(G0+G1 \cdot Y + G2 \cdot Y^2 +$$
$$G3 \cdot Y^3 + G4 \cdot Y^4 + \ldots) \cdot Z^2 +$$
$$(H0+H1 \cdot Y + H2 \cdot Y^2 +$$
$$H3 \cdot Y^3 + H4 \cdot Y^4 + \ldots) \cdot Z^3 +$$
$$(I0+I1 \cdot Y + I2 \cdot Y^2 + I3 \cdot Y^3 +$$
$$I4 \cdot Y^4 + \ldots) \cdot Z^4 +$$
$$(J0+J1 \cdot Y + J2 \cdot Y^2 + J3 \cdot Y^3 +$$
$$J4 \cdot Y^4 + \ldots) \cdot Z^5 +$$

-continued $$(K0 + K1 \cdot Y + K2 \cdot Y^2 + K3 \cdot Y^3 + K4 \cdot Y^4 + \ldots) \cdot Z^6 + \ldots$$

where $$Cs=(1/Rs)+B1 \cdot Y+B2 \cdot Y^2+B3 \cdot Y^3+B4 \cdot Y^4+B5 \cdot Y^5+ \quad (4)$$

$$Ks=Ks+C1 \cdot Y+C2 \cdot Y^2+C3 \cdot Y^3+C4 \cdot Y^4+C5 \cdot Y^5+ \quad (5)$$

and 'Rs0' denotes a radius of paraxial curvature in sub-scanning cross section including optical axis.

When any of the odd-order coefficients B1, B3, B5, . . . is other than 0, curvature in sub-scanning cross section is asymmetrical in main scanning direction.

Similarly, when any of the odd power coefficients of Y expressing a non-arc amount such as C1, C3, C5, . . . , F1, F3, F5, . . . , G1, G3, G5, . . . and so forth is other than 0, a non-arc amount in sub-scanning direction is asymmetrical in main scanning direction.

In this embodiment, the entrance surface of the correction lens (resin-made lens) 3a on the side of light source of the correction optical system 3 is the special toroidal surface expressed by the above expressions. Further, the four surfaces of the two scanning lenses 6a and 6b of the scanning and imaging optical system 6 are the special toroidal surfaces expressed by the above expressions.

In the optical scanning device in this embodiment shown in FIGS. 1, 2A, 2B and 3, when L denotes a surface separation between the resin-made lens 3a having the anamorphic surface and glass-made lens 3b having the anamorphic surface, and fs denotes the focal length in sub-scanning direction of the entirety of the correcting optical system 3, the following condition is satisfied:

$$0.005 < L/fs < 0.1$$

When the upper limit 0.1 of the above condition is exceeded, the distance between the deflection reflective surface 5a of the deflector 5 and the correction optical system 3 is too long in order to correct shift of focus occurring due to environmental change. Accordingly, the layout is limited. On the other hand, when the lower limit 0.005 is exceeded, the negative power of the resin-made lens 3a is too large, wavefront aberration increases, and it is difficult to obtain a small-diameter beam spot on the surface 7 to be scanned. In this embodiment, actually, $$L/fs=1.0/131=0.0076$$

In the optical scanning device having the above-described configuration, image surface shift amounts (imaging position shift) and image surface shift ranges in main/sub-scanning directions in a case (temperature cancellation case) where the temperature correction is performed by the correction optical system 3 are compared with those in a case (no temperature cancellation case) where no temperature correction is performed. The result of the comparison is shown in FIG. 6.

A specific example of the optical system of the optical scanning device in the first embodiment shown in FIGS. 1, 2A, 2B and 3 will now be described. The light source 1 is a semiconductor laser, and the wavelength of light emitted therefrom is 655 nm. The coupling lens 2 is a glass-made lens (FD10) in a single lens configuration held by an aluminum-made cell member, and has a focal length f=22.0 (mm), and a light flux emitted therefrom is a parallel light flux. In this example, a surface number of the exit-side lens surface of the coupling lens 2 is determined as 0, a surface number of the entrance-side lens surface of the resin-made correction lens 3a of the correcting optical system 3 is determined as 1, a surface number of the exit-side lens surface thereof is determined as 2, a surface number of the entrance-side lens surface of the glass-made correction lens 3b of the correcting optical system 3 is determined as 3, a surface number of the exit-side lens surface thereof is determined as 4, a surface number of the deflection reflective surface 5a of the deflector 5 is determined as 5, surface numbers of the two scanning lenses 6a and 6b of the scanning and imaging optical system 6 are determined as 6, 7, 8 and 9, in the order from the entrance side.

Each deflection reflective surface 5a of the polygon mirror of the light deflector 5 is plane, and a natural converging point thereof is ∞. This polygon mirror has six deflection reflective surfaces, and a radius of inscribed circle thereof is 25 mm. Further, the rotational center axis 5b thereof is away from a reflecting point (the position at which the chief ray of a deflected light flux intersects the deflection reflective surface when the chief ray of the light flux is parallel to optical axis of the scanning lenses 6a and 6b) by 10.7 mm in direction of the above-mentioned optical axis and 22.69 mm in main scanning direction. Further, when the chief ray of a deflected light flux is parallel to optical axis of the scanning lenses 6a and 6b, the angle (i. e., entrance angle onto the polygon mirror) formed between this chief ray and the chief ray of a light flux incident on the deflection reflective surface from the side of light source is 60 degrees. The field angle is −38 degrees through +38 degrees.

The correcting optical system 3 has the focal length f=131 (mm). The resin-made correction lens 3a has the refractive index n=1.52716. The first surface (the surface number: 1) thereof is the special toroidal surface having a concave shape, and the second surface (the surface number: 2) thereof is plane. The glass-made correction lens 3b has the refractive index n=1.514332 (BK7). The first surface (the surface number: 3) thereof is the special toroidal surface having a convex shape, and the second surface (the surface number: 4) thereof is plane.

The scanning lens 6a on the side of polygon mirror 5 of the scanning and imaging optical system 6 is made of resin, and has the refractive index n=1.52716. The first surface (the surface number: 6) thereof is the special toroidal surface having a concave shape, and the second surface (the surface number: 7) thereof is the special toroidal surface having a convex shape and having a curvature in sub-scanning cross section asymmetrical. The scanning lens 6b on the side of surface 7 to be scanned of the scanning and imaging optical system 6 is made of resin, and has the refractive index n=1.52716. The first surface (the surface number: 8) thereof is the special toroidal surface having a concave shape and having a curvature in sub-scanning cross section asymmetrical, and the second surface (the surface number: 9) thereof is the special toroidal surface having a convex shape and having a non-arc shape in each of main and sub-scanning cross sections.

Lens data of the optical system for the above-described radius Rm, Rs0 of paraxial curvature and surface separation x on optical axis is shown as follows:

| surface number | | Rm (mm) | Rs0 (mm) | x (mm) |
|---|---|---|---|---|
| correction lens 3a | 1 | −100.9 | −17.76 | 3.0 |
| | 2 | ∞ | ∞ | 1.0 |
| correction lens 3b | 3 | 100.0 | 15.0 | 3.0 |
| | 4 | ∞ | ∞ | 140.64 |
| deflection reflective surface 5a | 5 | ∞ | ∞ | 72.560 |
| scanning lens 6a | 6 | −242.186 | 242.337 | 31.572 |
| | 7 | −83.064 | 138.908 | 81.808 |
| scanning lens 6b | 8 | −239.054 | −78.986 | 9.854 |
| | 9 | −218.790 | −26.516 | 145.001 |

Further, values of respective coefficients in the above-mentioned expressions (1) through (5) for determining the special toroidal surfaces of the surface (surface number=1) of the resin-made correction lens 3a, and the surface (surface number=6) and the surface (surface number=7) of the scanning lens 6a, and the surface (surface number=8) and the surface (surface number=9) of the scanning lens 6b are shown below. In data of each coefficient, 'E' and a numerical value following a numerical value denote to multiply power of 10. For example, 'E−15' denote '×$10^{-15}$'.

Surface

Surface Number=1

$Am1, Am2, Am3, Am4, Am5, \ldots = 0$
$B2=-2.9712E-05, B4=-8.5101E-07, B6=4.1938E-09$
$C0=1.8861E+00, C1=4.5792E-02, C3=-5.6507E-04$
$I0=-3.0182E-05, I1=-9.6650E-07, I3=1.2955E-08$
$K0=-1.4683E-06, K1=4.9604E-08, K3=1.2755E-08$ Surface Surface Number=6

$Am2=6.9335E-01, Am4=-3.7002E-09, Am6=5.3962E-12$
$Am8=-2.6877E-14, Am10=3.2892E-18$
$B2=-1.0850E-05, B4=4.4623E-09, B6=-1.4980E-12$
$B8=-1.1955E-15, B10=1.4318E-18, B12=-3.5225E-22$
$B14=-2.8072E-25, B16=1.3039E-28$

Surface

Surface Number=7

$Am2=-2.3702E-01, Am4=5.2751E-08, Am6=-2.0673E-13$
$Am8=6.1916E-16, Am10=-2.1272E-18$
$B1=1.1285E-05, B3=8.2414E-09, B5=-8.3701E-12$
$B7=1.6093E-15, B9=1.0336E-19$

Surface

Surface Number=8

$Am2=-9.0813E+00, Am4=-1.3697E-10, Am6=-1.0361E-12$
$Am8=-1.5020E-16, Am10=-1.2669E-21, Am12=-4.0301E-25$
$Am14=5.7340E-30, Am16=1.6885E-33$
$B1=1.5474E-06, B3=2.8010E-10, B5=-1.2492E-13$
$B7=2.5220E-17, B9=-3.6112E-21, B11=2.9135E-25$
$B13=-1.6452E-29, B15=1.7857E-33, B17=-1.0747E-37$

Surface

Surface Number=9

$Am2=-7.4453E+00, Am4=-7.0557E-08, Am6=1.9461E-13$
$Am8=-1.3606E-16, Am10=-5.2312E-21, Am12=-2.0517E-29$
$Am14=-2.4196E-34$
$B2=-1.1619E-08, B4=-2.2670E-11, B6=-1.5740E-15$
$B8=-4.5789E-20, B10=-3.8438E-24, B12=-7.4648E-28$
$B14=-5.8757E-32, B16=1.1024E-36, B18=1.5980E-40$
$C0=-3.1492E-01$
$I0=3.1657E-06, I1=-1.3699E-09, I2=1.2086E-10$
$I3=4.1379E-12, I4=3.0682E-13, I5=-7.2697E-15$
$I6=-1.1934E-16, I7=4.3896E-18, I8=1.3145E-20$
$I9=-1.2026E-21, I10=-2.1378E-24, I11=1.7132E-25$
$I12=7.8714E-28, I13=-1.3127E-29, I14=-1.2411E-31$
$I15=5.1005E-34, I16=8.2218E-36, I17=-7.8048E-39$
$I18=-1.9700E-40$
$K0=3.3658E-08, K1=5.7068E-11, K2=-1.1867E-11$
$K3=-1.6517E-13, K4=-6.3184E-15, K5=3.0942E-16$
$K6=-1.4550E-18, K7=-1.9660E-19, K8=3.0045E-21$
$K9=5.6936E-23, K10=-9.5063E-25, K11=-8.6717E-27$
$K12=1.3624E-28, K13=7.2210E-31, K14=-1.0155E-32$
$K15=-3.1157E-35, K16=3.8226E-37, K17=5.4542E-40$
$K18=-5.7217E-42$

Figure 7A:
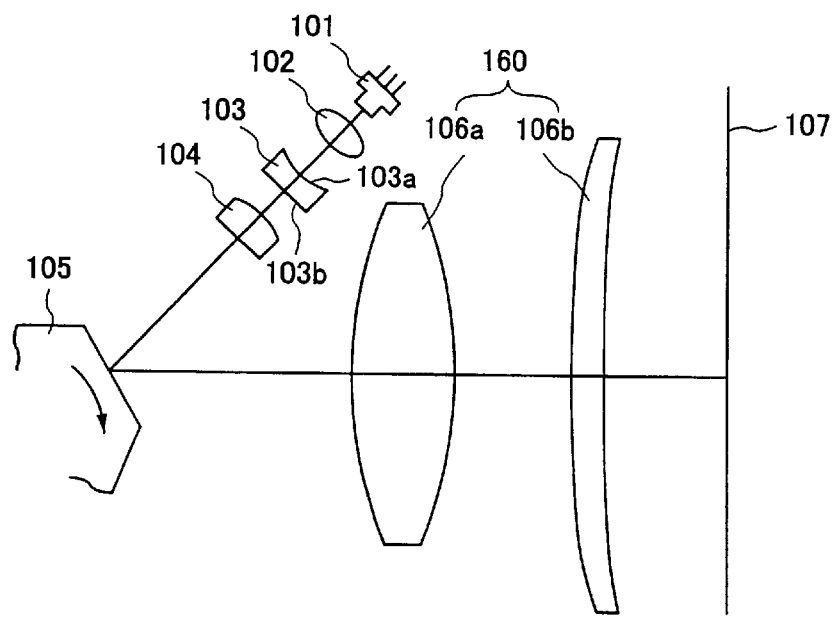
FIGS. 7A and 7B illustrate an optical scanning device in a second embodiment of the present invention.
Figure 7B:
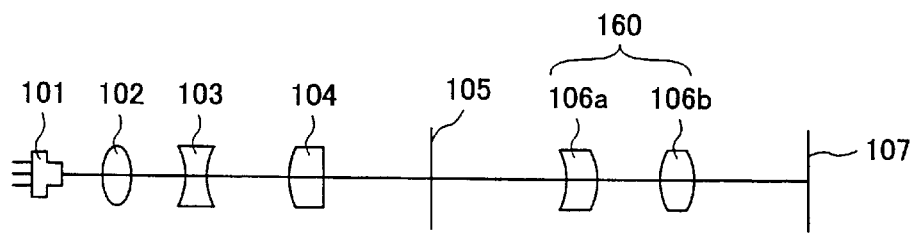

FIGS. 7A and 7B illustrate a second embodiment of the present invention.

FIG. 7A shows a state viewed from sub-scanning direction, and FIG. 7B is a figure drawn as a result of a light path from a light source up to a surface to be scanned being expanded linearly and in a manner such that a vertical direction coincides with sub-scanning direction.

A light source 101 is a semiconductor laser. A divergent beam emitted from the light source 101 is transformed by a coupling lens 102 functioning as a coupling optical system into a predetermined style of beam suitable for a subsequent optical system. The predetermined style of beam may be either a divergent beam or a convergent beam. However, in the second embodiment, it is a parallel beam. The beam obtained from the coupling lens 102 passes through two lenses 103 and 104 functioning as a line-image forming optical system in sequence, is condensed in sub-scanning direction by the function of the line-image forming optical system, and forms a line image long in main scanning direction on or in the proximity of a deflection reflective surface of a polygon mirror 105 functioning as a light deflector.

The beam reflected by the deflection reflective surface passes through an fθ lens 160 functioning as a scanning and imaging optical system (consisting of two lenses 106a and 106b in the second embodiment), is condensed toward the surface 107 to be scanned by the function of the scanning and imaging optical system, and forms a beam spot on the surface 107 to be scanned.

When the polygon mirror 105 rotates at a uniform velocity, the reflected beam is deflected at a uniform angular velocity, and the beam spot scans the surface 107 to be scanned. At this time, the scanning by the beam spot is made to be of uniform velocity in accordance with an fθ characteristic of the fθ lens 160.

Both two lenses 106 a and 106 b of the fθ lens 160 are resin-made lenses. Thereby, when a temperature change occurs in the optical scanning device, the refractive index of material and shape of the lenses 106a and 106b change. This change causes shift of image surface (shift of image surface occurring due to temperature change). This shift of image surface occurring due to temperature change is corrected by the line-image forming optical system.

The lens 103 of the line-image forming optical system is made of resin (resin-made lens), and the lens 104 thereof is made of glass (glass-made lens).

An entrance surface 103a of the resin-made lens 103 on which a parallel beam from the coupling lens 102 is first incident has a negative power in each of main scanning direction and sub-scanning direction. The negative power in main scanning direction is different from the negative power in sub-scanning direction. The negative power in sub-scanning direction is larger than the negative power in main scanning direction.

An exit surface 103b of the lens 103 is a cylindrical surface having a negative power only in sub-scanning direction.

A beam exiting from the resin-made lens 103 is incident on the glass-made lens 104. The glass-made lens 104 is a toroidal lens, transforms the incident beam into an approximately parallel beam in main scanning direction but condenses the incident beam in sub-scanning direction. A beam exiting from the glass-made lens 104 is incident on the deflection reflective surface of the polygon mirror 105, being condensed in sub-scanning direction, and forms a line image long in main scanning direction at a position of the deflection reflective surface.

It is also possible that the glass-made lens 104 is not a toroidal lens but a cylindrical lens as a result of the coupled condition (style of the coupled beam) of a beam exiting from the coupling lens 102 being changed (for example, the style of the coupled beam being transformed into a somewhat convergent beam) or the like.

The shift of image surface in main scanning direction of the shift of image surface occurring due to temperature change of the resin-made lenses 106a and 106b of the fθ lens 160 is corrected by the negative power in main scanning direction of the entrance surface 103a of the resin-made lens 103. The shift of image surface in sub-scanning direction of the shift of image surface occurring due to temperature change of the resin-made lenses 106a and 106b of the fθ lens 160 is corrected by the negative powers of the entrance surface 103a and exiting surface 103b of the resin-made lens 103.

The fθ lens 160 is an anamorphic imaging system such that the position of deflection reflective surface and position of surface to be scanned are made to have approximately conjugate relationship in sub-scanning direction, and a positive power in sub-scanning direction is larger than a positive power in main scanning direction. Thereby, the shift of image surface in sub-scanning direction occurring due to temperature change is larger than the shift of image surface in main scanning direction occurring due to the temperature change. Accordingly, a larger negative power is needed for correcting the shift of image surface in sub-scanning direction. However, because both entrance surface 103a and exit surface 103b of the resin-made lens 103 have negative powers in sub-scanning direction, the radius of curvature in sub-scanning direction of each of the entrance surface 103a and exit surface 103b may be larger in comparison to a case where only single surface is used for the correction. Accordingly, manufacture and assembly of the resin-made lens 103 is easier. Further, as a result of the negative powers of the entrance surface 103a and exit surface 103b being made to be approximately equivalent, an advantage (the radius of curvature of one surface being prevented from being too small) obtained from distributing the negative power between the two surfaces increases.

Figure 8A:
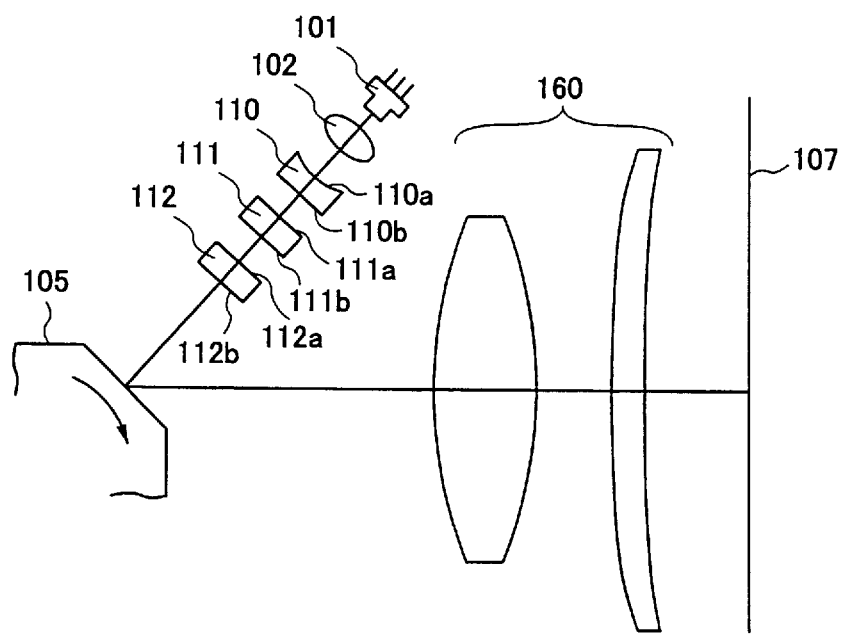
FIGS. 8A and 8B illustrate an optical scanning device in a third embodiment of the present invention.
Figure 8B:
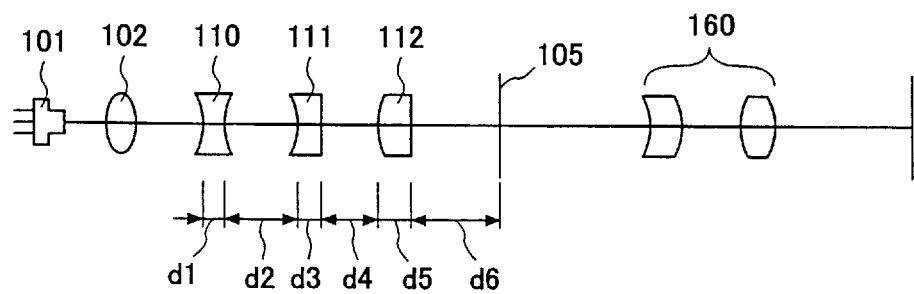

FIGS. 8A and 8B show an optical scanning device in a third embodiment of the present invention in the manners same as those of FIGS. 7A and 7B.

The same reference numerals are given to the components the same as those of FIGS. 7A and 7B.

In the third embodiment, a line-image forming optical system consists of three lenses 110, 111 and 112. The two lenses 110 and 111 are made of resin while the lens 112 is made of glass.

The entrance surface 110a of the resin-made lens 110 has a negative power in each of main scanning direction and sub-scanning direction, the negative power in sub-scanning direction being larger than the negative power in main scanning direction.

The exit surface of the resin-made lens 110 has a negative power only in sub-scanning direction.

The entrance surface 111a of the resin-made lens 111 has a negative power only in sub-scanning direction, but the exit surface 111b thereof is plane.

The entrance surface 112a of the glass-made lens 112 is a cylindrical surface having a positive power only in sub-scanning direction, but the exit surface 112b thereof is a spherical surface having a positive power.

Accordingly, the shift of image surface in main scanning direction of the shift of image surface occurring due to temperature change of the resin-made lenses 106a and 106b of the fθ lens 160 is corrected by the power in main scanning direction of the entrance surface 110a of the resin-made lens 110. The shift of image surface in sub-scanning direction of the shift of image surface occurring due to the temperature change of the resin-made lenses 106a and 106b of the fθ lens 160 is corrected by the respective negative powers in sub-scanning direction of the entrance surface 110a and exiting surface 110b of the resin-made lens 110 and entrance surface 111a of the resin-made lens 111. Thus, the negative power needed for the correction can be distributed among the three surfaces 110a, 110b and 111a. Thereby, in comparison to the case of the second embodiment shown in FIGS. 7A and 7B, it is possible to further enlarge the radius of curvature of each surface. Accordingly, it is possible to manufacture and assemble the resin-made lenses 110 and 111 easier.

Further, by making the negative powers of these three surfaces to be approximately equal, it is possible to increase the advantage obtained from distributing the negative power among the three surfaces.

In the third embodiment shown in FIGS. 8A and 8B, it is also possible that the required negative power in sub-scanning direction is also distributed to the exit surface of the resin-made lens 111, and, thus, the negative power in sub-scanning direction needed for the correction is distributed among the four surfaces.

Figure 9A:
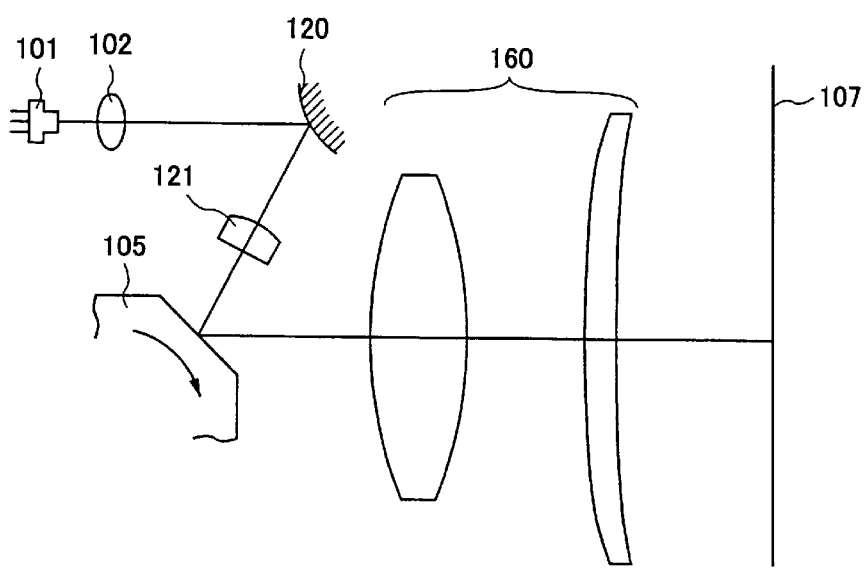
FIGS. 9A and 9B illustrate an optical scanning device in a fourth embodiment of the present invention.
Figure 9B:
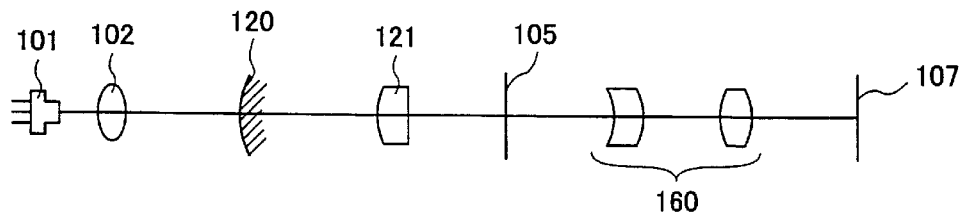

FIGS. 9A and 9B show an optical scanning device in a fourth embodiment of the present invention in the manners same as those of FIGS. 7A and 7B.

The same reference numerals are given to the components same as those of FIGS. 7A and 7B.

In the fourth embodiment, a line-image forming optical system consists of one surface of resin-made imaging mirror 120 and a glass-made lens 121.

The resin-made imaging mirror 120 has an anamorphic convex shape, has a negative power in main scanning direction and a larger negative power in sub-scanning direction. Accordingly, a parallel beam from the coupling lens 102 is reflected and transformed into a divergent beam by the resin-made imaging mirror 120. In this beam, the divergentity in sub-scanning direction is larger than the divergentity in main scanning direction.

The glass-made lens 121 is a toroidal lens having a positive power in each of main scanning direction and sub-scanning direction, the power in sub-scanning direction being larger than that in main scanning direction, and transforms the incident beam into a beam parallel in main scanning direction but convergent in sub-scanning direction.

The shift of image surface in main scanning direction of the shift of image surface occurring due to temperature change of the resin-made lenses 106a and 106b of the fθ lens 160 is corrected by the power in main scanning direction of the resin-made imaging mirror 120. The shift of image surface in sub-scanning direction of the shift of image surface occurring due to the temperature change of the resin-made lenses 106a and 106b of the fθ lens 160 is corrected by the power in sub-scanning direction of the resin-made imaging mirror 120.

A radius of curvature of a reflective surface of reflective imaging system can be approximately four times as large as a radius of curvature of a refractive surface in a case where the same power is achieved by the refractive surface. Accordingly, when only the one reflective surface of the resin-made imaging mirror 120 is used for the correction of shift of image surface as in the fourth embodiment, the radius of curvature of the reflective surface should not be so small. As a result, it is possible to decrease working accuracy and assembly accuracy of the resin-made imaging mirror 120.

Figure 10A:
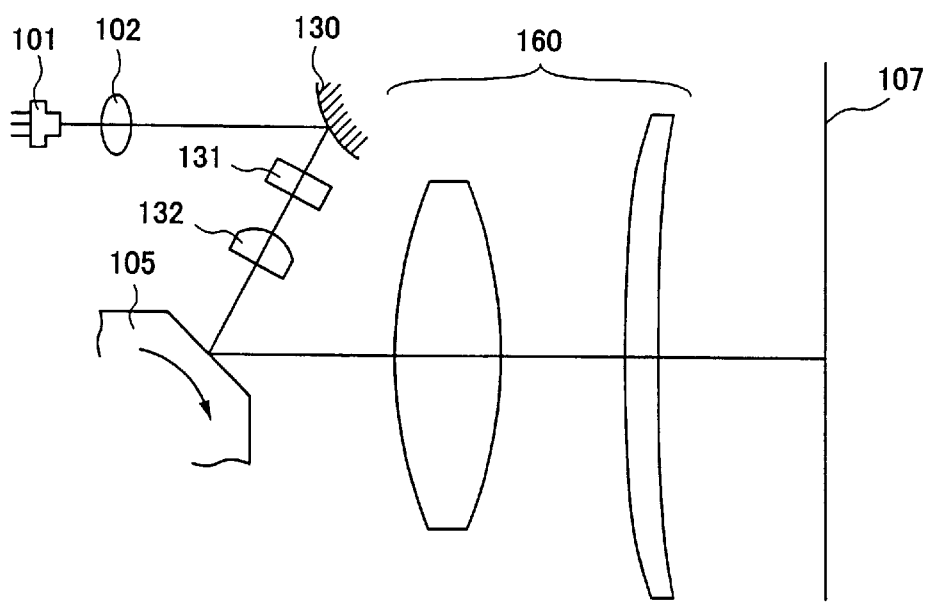
FIGS. 10A and 10B illustrate an optical scanning device in a fifth embodiment of the present invention.
Figure 10B:
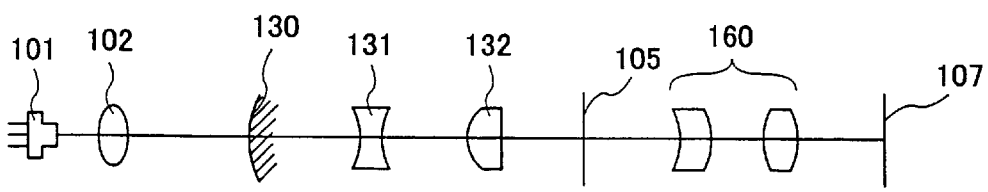

FIGS. 10A and 10B show an optical scanning device in a fifth embodiment of the present invention in the manners same as those of FIGS. 7A and 7B.

The same reference numerals are given to the components same as those of FIGS. 7A and 7B.

In the fifth embodiment, a line-image forming optical system consists of a resin-made imaging mirror 130, a resin-made lens 131 and a glass-made lens 132.

The resin-made imaging mirror 130 has a negative power in each of main scanning direction and sub-scanning direction. Each of the entrance surface and exit surface of the resin-made lens 131 has a negative power only in sub-scanning direction. The line-image forming optical system causes a beam from the coupling lens 102 to form a line image long in main scanning direction. Accordingly, the glass-made lens 132 necessarily has a positive power in sub-scanning direction. The glass-made lens 132 has a positive power in main scanning direction smaller than that of sub-scanning direction.

The shift of image surface in main scanning direction of the shift of image surface occurring due to temperature change of the resin-made lenses 106a and 106b of the fθ lens 160 is corrected by the power in main scanning direction of the resin-made imaging mirror 130. The shift of image surface in sub-scanning direction of the shift of image surface occurring due to temperature change of the resin-made lenses 106a and 106b of the fθ lens 160 is corrected by the powers in sub-scanning direction of the resin-made imaging mirror 130 and entrance and exit surfaces of the resin-made lens 131.

Thus, the negative power in sub-scanning direction needed for the correction of shift of image surface is distributed among the reflective surface of the resin-made imaging mirror 130 and lens surfaces of the resin-made lens 131. Thereby, it is possible to effectively enlarge the radius of curvature of each surface, and to manufacture and assemble these optical components easier.

The negative power in main scanning direction needed for the correction of shift of image surface in main scanning direction may be given only to the reflective surface of the resin-made imaging mirror 130, or may also be distributed to the lens surface(s) of the resin-made lens 131 as well as the resin-made imaging mirror 130. Alternatively, it is also possible that no power in main scanning direction is given to the resin-made imaging mirror 130, and only the negative power in main scanning direction given to the lens surface(s) of the resin-made lens 131 is used for the correction.

A specific example of the third embodiment shown in FIGS. 8A and 8B will now be described.

A beam from the light source is transformed into a parallel beam by the coupling lens.

The coupling lens has a focal length of 27 mm, and is held by a cylinder, the material of which is aluminum (coefficient of linear expansion: $2.31 \times 10^{-5}$). Accordingly, when the temperature changes from 25° C. to 10° C., the distance between the object point and coupling lens shrinks by 0.00936 mm, and a light flux obtained from the coupling lens becomes slightly divergent. When the temperature changes from 25° C. to 45° C., the distance between the object point and coupling lens expands by 0.01247 mm, and a light flux obtained from the coupling lens becomes slightly convergent.

The light source 101 is a semiconductor laser and a wavelength of light therefrom is 780 nm.

The fθ lens 160 has a composite focal length in main scanning direction of 225.3 mm, and a composite focal length in sub-scanning direction of 78 mm. The writing width (effective optical scanning range) is ±161.5 mm, and the field angle is ±40.6 degrees.

The surface separations $d_1$ through $d_6$ shown in FIG. 8B are as follows:

$d_1$=3 (mm); $d_2$=5 (mm); $d_3$=3 (mm); $d_4$=5 (mm); $d_5$=6 (mm); and $d_6$=129.8 (mm).

The radius of curvature of each of the entrance surfaces and exit surfaces of resin-made lenses 110, 111 and glass-made lens 112 are as follows:

110a: −119.52 mm in main scanning direction, −16.7 mm in sub-scanning direction;

110b: ∞ in main scanning direction, 16.7 mm in sub-scanning direction;

111a: ∞ in main scanning direction, −16.7 mm in sub-scanning direction;

111b: ∞ in main scanning direction, ∞ in sub-scanning direction;

112a ∞ in main scanning direction, 13.54 mm in sub-scanning direction;

112b −179.978 mm (spherical surface)

The refractive index of each of the resin-made lenses 110 and 111 is 1.523978 (λ=780 nm, 25° C.), and the refractive index of the glass-made lens 112 is 1.733278 (λ=780 nm, 25° C.). The lens surfaces 110a, 110b and 111a have the same radius of curvature in sub-scanning direction. Accordingly, the negative powers in sub-scanning direction of these surfaces are the same as each other.

Figure 11A:
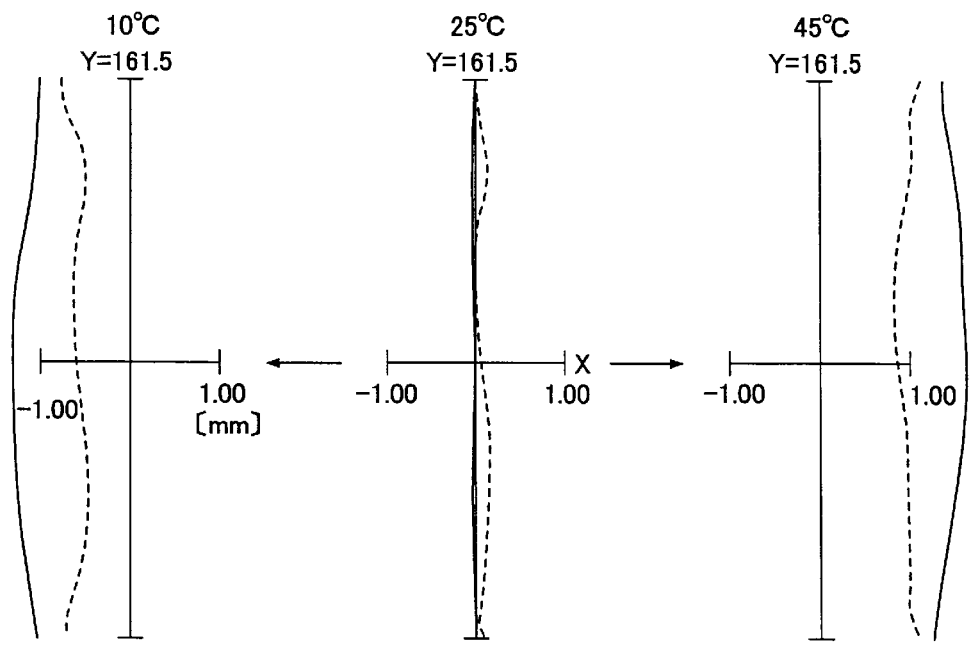
FIGS. 11A and 11B illustrate shift of image surface occurring due to temperature change and correction thereof in a specific example of the third embodiment.

This specific example of the third embodiment is designed such that the above-mentioned temperature 25° C. is regarded as a reference temperature. The curvature of field in the reference temperature of 25° C. is shown in the middle of FIG. 11A. The broken line represents the curvature of field in main scanning direction while the solid line represents the curvature of field in sub-scanning direction.

When the line-image forming optical system does not have the function of correcting shift of image surface occurring due to temperature change, that is, when the optical characteristics of the line-image forming optical system is not affected by temperature change, the curvature of field in main scanning direction and sub-scanning direction changes into those shown on the right side of FIG. 11A when the ambient temperature (temperature in the optical scanning device) increases into 45° C., and the curvature of field in main scanning direction and sub-scanning direction changes into those shown on the left side of FIG. 11A when the ambient temperature (temperature in the optical scanning device) decreases into 10° C.

Figure 11B:
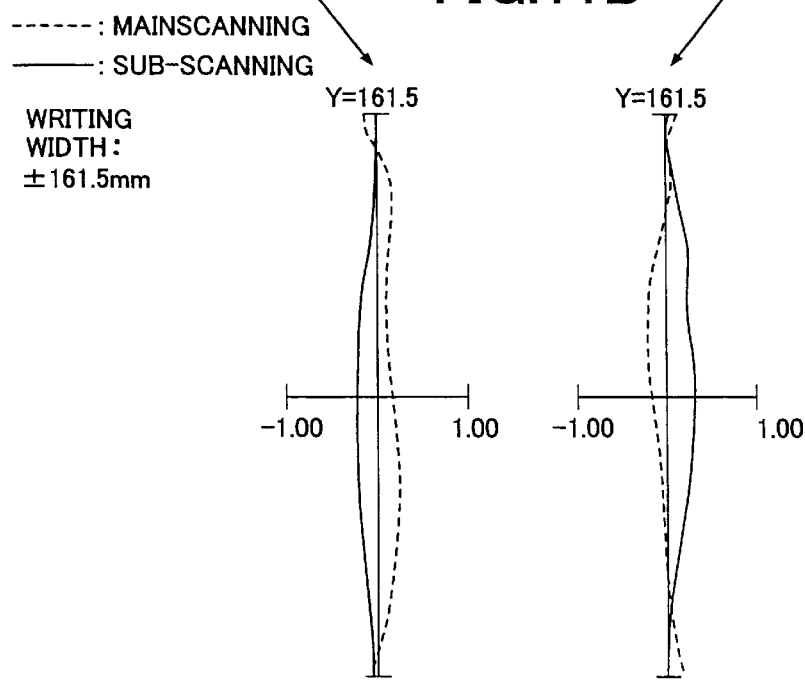

However, actually, in the case of the above-described specific example of the third embodiment, the lenses 110 and 111 are made of resin, and the optical characteristics thereof change with temperature change. Accordingly, the curvature of field in main scanning direction and sub-scanning direction is corrected into that shown on the right side of FIG. 11B when the ambient temperature (temperature in the optical scanning device) increases into 45° C., and the curvature of field in main scanning direction and sub-scanning direction is corrected into that shown on the left side of FIG. 11B when the ambient temperature (temperature in the optical scanning device) decreases into 10° C. From this result, it can be seen that the function of correcting shift of image surface of the resin-made lenses 110 and 111 of the line-image forming optical system of the above-described specific example of the third embodiment is excellent.

When a diameter of beam spot on the surface to be scanned is reduced, it is necessary that wavefront aberration is satisfactorily small. If not, the light-intensity distribution of a beam spot is not a simple mountain shape, and, therefore, it is not possible to achieve a satisfactory spot shape.

Figures 12A, 12B:
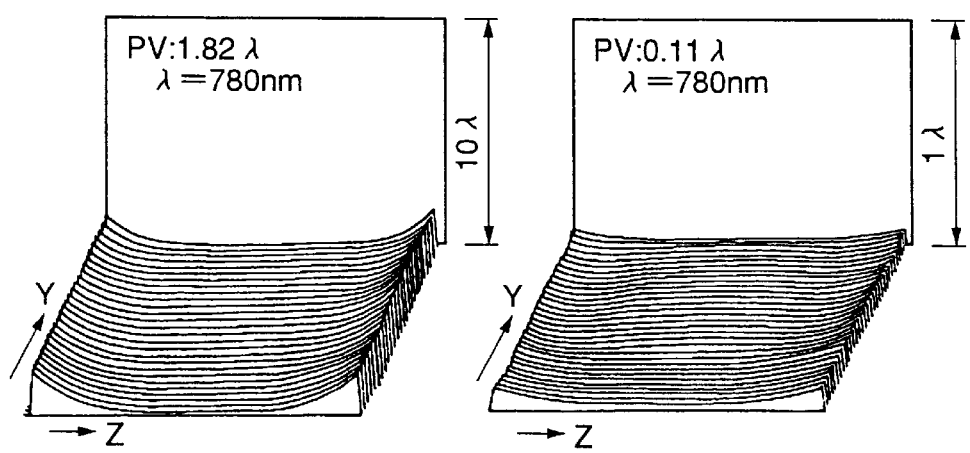
FIG. 12A shows wavefront aberration in the specific example of the third embodiment.
FIG. 12B shows wavefront aberration in the specific example of the third embodiment in which a shape of one lens surface in sub-scanning direction is made to be a non-arc shape.

The wavefront aberration in sub-scanning when an image height of beam spot is 0 mm is shown in FIG. 12A. This wavefront aberration is not so large. However, the maximum (peak value 'PV') is larger than $1\lambda$. Accordingly, when the spot diameter in sub-scanning direction is very small, it is not possible to further reduce the spot diameter in sub-scanning direction.

In such a case, it is possible to correct the wavefront aberration as a result of a surface having a non-arc shape in sub-scanning direction being included in the line-image forming optical system. For example, when the entrance surface 110a of the lens 110 of the specific example of the third embodiment is made to have a non-arc shape in sub-scanning direction and the non-arc shape is made optimum according to the correction of wavefront aberration, the wavefront aberration is that shown in FIG. 12B. In this wavefront aberration, the maximum is $0.11\lambda$. Thus, the wavefront aberration is corrected into on the order of ⅟₁₆ that of FIG. 12A. When the wavefront aberration is so small, it is possible to reduce a spot diameter in sub-scanning direction to a very small one and achieve a satisfactory beam spot.

Figure 13A:
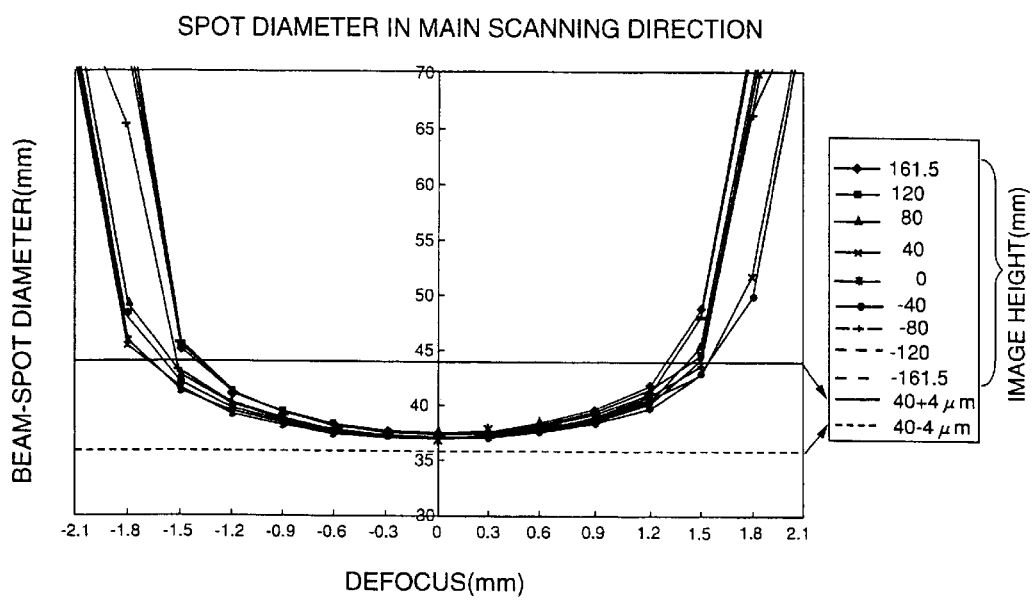
FIGS. 13A and 13B show relationship between defocus and spot diameter on the specific example of the third embodiment.
Figure 13B:
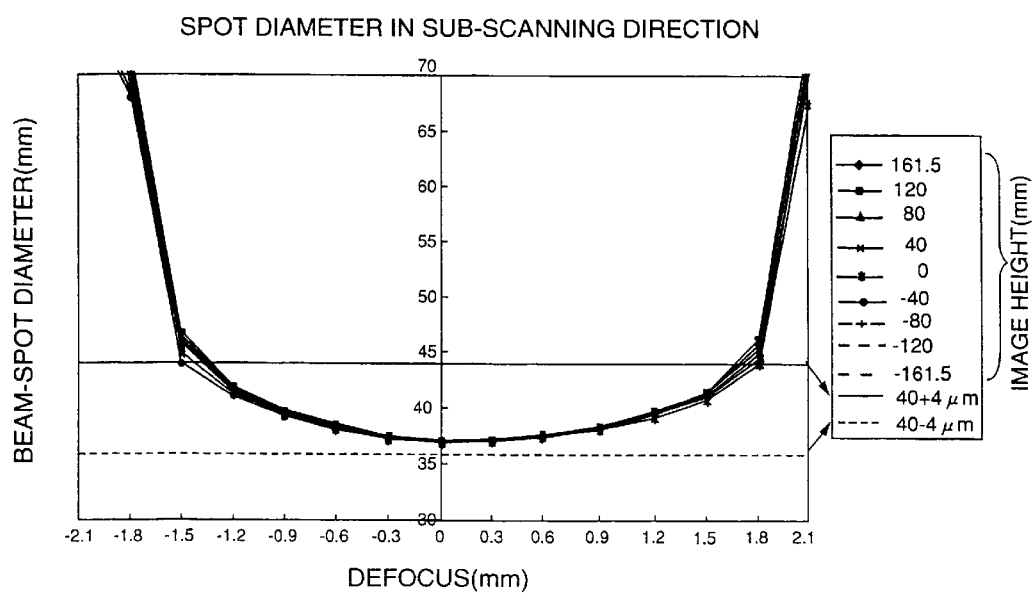

FIGS. 13A and 13B show a relationship between defocus (a difference between the beam waist and surface to be scanned) and spot diameter on the above-described specific example of the third embodiment. FIG. 13A relates to main scanning direction and FIG. 13B relates to sub-scanning direction.

The above-described specific example of the third embodiment is designed so that a target of a spot diameter of beam spot performing optical scanning is 40 μm, and the spot diameter is achieved to 37 μm when defocus is 0 so that a variation range of the spot diameter is within 45±4 μm. As a result, the focal depth W (a defocus range such that the variation range of the spot diameter is within 45±4 μm) is approximately 2.7 mm (±1.35 mm) in main scanning direction, and approximately 3 mm (±1.5 mm) in sub-scanning direction.

Accordingly, the shift amount of image surface due to temperature change should be controlled within ±1.35 mm in main scanning direction and within ±1.5 mm in sub-scanning direction.

Because the guaranteed range of temperature of the optical scanning device is approximately 10° C. through 45° C., when the reference temperature (room temperature) is determined as 25° C., the remaining shift amount of position of image surface after the correction is made by the line-image forming optical system should be within 0.06 mm/° C. Accordingly, the line-image forming optical system should be designed to satisfy this condition.

In each of the second through fifth embodiments shown in FIGS. 7A through 10B, the number of beams from the light source is one. However, it is also possible to embody the present invention as an optical scanning device of multi-beam type in which a plurality of light sources such as LDs or the like are combined, or a semiconductor laser array having a plurality of light emitting points is used as a light source.

As described above, the image surface is obtained as a collection of the beam-waist positions in main scanning direction and sub-scanning direction, and the shift amount of image surface can be actually measured as shift of beam-waist positions in each image height. Further, the shift of beam-waist positions is approximately equivalent to the shift of curvature of field.

The above description of the second through fifth embodiments assumes that each of the optical components disposed on the light path from the light source up to the surface to be scanned are worked in accordance with design and disposed at proper positions.

However, when the optical scanning device is actually embodied, working errors and assembly errors inevitably occur for each optical component. These errors occur in accordance with probability, and are different corresponding to particular optical components.

The scanning and imaging optical system thereof is most likely to have working errors occurring therein and to be affected thereby. When optical components of the scanning and imaging optical system have working errors and/or assembly errors occurring therefor, the position of beam waist of deflected beam shifts from the surface to be scanned, and shift of image surface in main scanning direction and sub-scanning direction occurs in the effective optical scanning range.

Imaging adjustment according to the present invention is a method of adjusting the beam-waist positions in main scanning direction and sub-scanning direction with respect to the surface to be scanned, in such a case.

For example, in a case where the configuration of optical system of the optical scanning device is such as that shown in FIGS. 10A and 10B, when the beam-waist positions in main scanning direction and sub-scanning direction shift with respect to the surface 107 to be scanned due to working errors and/or the like of fθ lens 160 and/or the like, the imaging adjustment should be done as will be described below.

Figure 14:
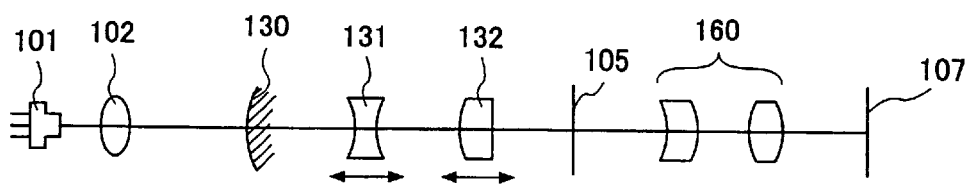
FIG. 14 illustrate a case where an imaging adjustment method according to the present invention is embodied in the fourth embodiment shown in FIGS. 9A and 9B.

As shown in FIG. 14, the resin-made lens 131 and glass-made lens 132 of the resin-made imaging mirror 130, resin-made lens 131 and glass-made lens 132 are movable in direction of optical axis.

Because the glass-made lens 132 has the power also in main scanning direction, it is possible to correct shift of beam-waist positions in main scanning direction occurring due to working errors and/or the like of the fθ lens 160 and/or the like by moving the glass-made lens 132 in direction of optical axis, and to perform adjustment such that the beam-waist positions in main scanning direction approximately coincide with the surface 107 to be scanned. Then, after such adjustment is done, the glass-made lens 132 is fixed.

Because the resin-made lens 131 has the power only in sub-scanning direction, it is possible to correct shift of beam-waist positions in sub-scanning direction occurring due to working errors and/or the like of the fθ lens 160 and/or the like without shifting the beam-waist positions in main scanning direction (adjusted previously) by moving the resin-made lens 131 in direction of optical axis, and to perform adjustment such that the beam-waist positions in sub-scanning direction approximately coincide with the surface 107 to be scanned. Then, after such adjustment is done, the resin-made lens 131 is fixed. As a result of performing such imaging adjustment, it is possible to achieve satisfactory coincidence between the image surface and surface 107 to be scanned.

With regard to the above-mentioned fixing of the resin-made lens 131 and glass-made lens 132 after the adjustment, by performing in-the-air bonding such as to fixing at least one of these lenses using ultraviolet-curing resin or the like, a V-shape groove needed for rotating a lens holder about optical axis, needed in the related art, is not needed. Further, when the resin-made lens 131 is fixed through the above-mentioned in-the-air bonding, it is not necessary to apply a load thereto by a leaf spring or the like, and, as a result, it is possible to prevent it from being deformed unnecessarily.

Figure 15:
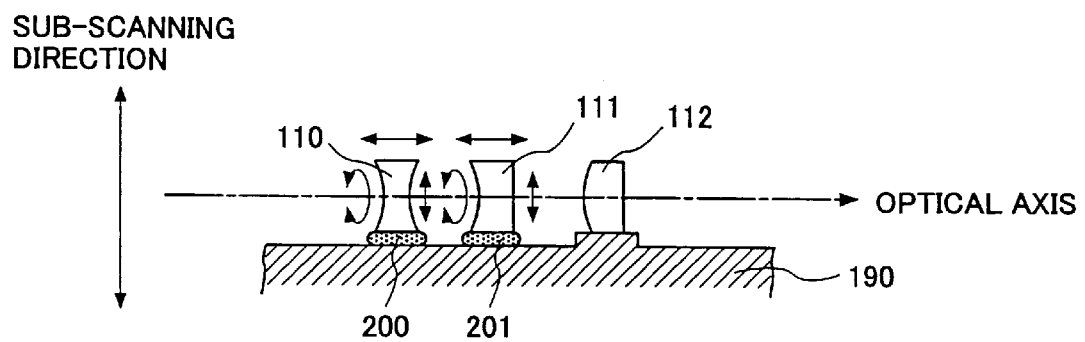
FIG. 15 illustrate a case where the imaging adjustment method according to the present invention is embodied in the third embodiment shown in FIGS. 8A and 8B.

FIG. 15 illustrates a case where the imaging adjustment method is embodied for the optical scanning device shown in FIGS. 8A and 8B.

Because the resin-made lens 110 has the power in main scanning direction, it is possible to correct shift of beam-waist positions in main scanning direction occurring due to working errors and/or the like of the fθ lens 160 and/or the like by moving the glass-made lens 110 in direction of optical axis, and to perform adjustment such that the beam-waist positions in main scanning direction approximately coincide with the surface 107 to be scanned. Then, after such adjustment is done, the resin-made lens 110 is fixed. Because the resin-made lens 111 has the power in sub-scanning direction, it is possible to correct shift of beam-waist positions in sub-scanning direction occurring due to working errors and/or the like of the fθ lens 160 and/or the like by moving the resin-made lens 111 in direction of optical axis, and to perform adjustment such that the beam-waist positions in sub-scanning direction approximately coincide with the surface 107 to be scanned. Then, after such adjustment is done, the resin-made lens 111 is fixed.

When the resin-made lens 110 having different powers in main scanning direction and sub-scanning direction is moved in direction of optical axis, and thus the beam-waist positions in main scanning direction are adjusted to approximately coincide with the surface 107 to be scanned, the beam-waist positions in sub-scanning directions are shifted thereby. However, because the resin-made lens 111 has the power only in sub-scanning direction, it is possible to then adjust the beam-waist positions in sub-scanning direction to cause them to approximately coincide with the surface 107 to be scanned.

Further, because the resin-made lenses 110 and 111 are anamorphic, when rotary positional errors abound optical axis and/or shift of optical axis in sub-scanning direction occurs in these lenses, wavefront aberration increases, and it is difficult to satisfactorily form a small-diameter beam spot.

Figures 16A, 16B:
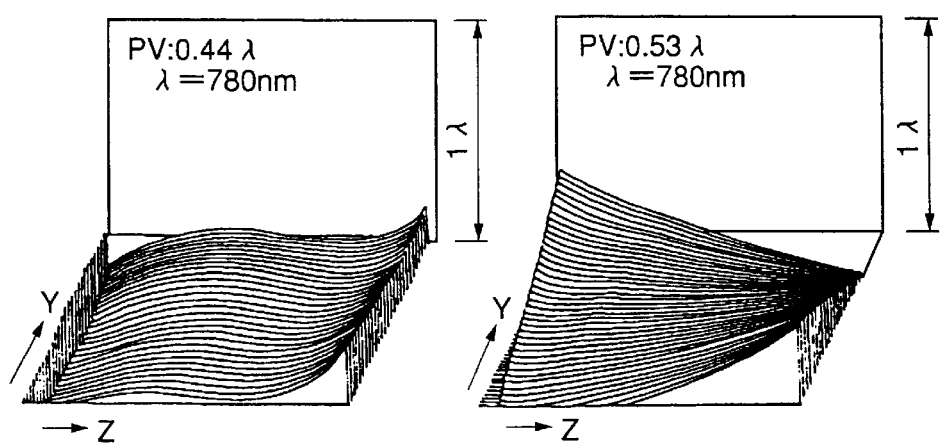
FIGS. 16A and 16B illustrate increase in wavefront aberration when a resin-made lens 110 has an orientation error about optical axis and when the same lens is shifted in sub-scanning direction, in the specific example of the third embodiment.

For example, in the above-described specific example of the third embodiment, the wavefront aberration appearing when the shape in sub-scanning direction of the entrance-side lens surface 110a of the resin-made lens 110 is made to be a non-arc shape and is optimized is shown in FIG. 12B. However, in this case, when the resin-made lens 110 is shifted by 0.1 mm in sub-scanning direction from the proper position, the wavefront aberration is such as that shown in FIG. 16A, and thus the maximum increases to $0.44\lambda$. When the resin-made lens 110 is rotated about optical axis by 0.05 degrees from the proper orientation, the wavefront aberration is such as that shown in FIG. 16B, and thus the maximum increases to $0.53\lambda$.

Accordingly, when the resin-made lenses 110 and 111 are fixed, rotational orientation about optical axis and position in sub-scanning direction should be adjusted.

In FIG. 15, the resin-made lenses 110 and 111 are fixed through the in-the-air bonding using ultraviolet-curing resin or the like after the adjustment. The glass-made lens 112 is fixed on a base 190.

The resin-made lenses 110 and 111 are chucked, and, in a condition where they are thus located in the air, the above-mentioned adjustment are performed thereon, and, then, they are fixed by being bonded using ultraviolet-curing resin or the like. Thus, the resin-made lenses 110 and 111 are fixed on the base 190 through adhesives 200 and 201, respectively, as shown in FIG. 15.

In the imaging adjustment methods described with reference to FIGS. 14 and 15, it is possible to employ adjustment of a relative positional relationship between the resin-made mirror 120 or 130 and the light-source-side optical system (the light source 101 and coupling lens 102) for adjusting the beam-waist positions.

The line-image forming optical system of the optical scanning device in each of the second and third embodiments described with reference to FIGS. 7A through 8B is a line-image forming optical system of an optical scanning device through which a beam from the light source 101 is transformed into a beam in a predetermined style (parallel beam) by the coupling optical system 102, this beam is caused to form a line image long in main scanning direction by the line-image forming optical system 103, 104 (110, 111, 112), then, is deflected by the light deflector 105 having the deflection reflective surface on or in the proximity of the imaging position of the line image, the deflected beam is condensed toward the surface 107 to be scanned by the scanning and imaging optical system 160, a beam spot is formed on the surface 107 to be scanned, and optical scanning of the surface 107 to be scanned is performed. This line-image forming optical system has one or a plurality of resin-made lens(es) 103 (110, 111) and one or a plurality of glass-made lens(es) 104 (112). The one or plurality of resin-made lens(es) includes at least two surfaces 103a, 103b (110a, 110b, 111a) each having a negative power in sub-scanning direction and at least one surface 103a (110a) each having a negative power in main scanning direction. The power of each surface of the one or plurality of resin-made lens(es) is set so that shift of image surface occurring due to temperature change of the scanning and imaging optical system 160 is effectively reduced.

The line-image forming optical system of the optical scanning device in the fourth embodiment described with reference to FIGS. 9A and 9B is a line-image forming optical system of an optical scanning device through which a beam from the light source 101 is transformed into a beam in a predetermined style (parallel beam) by the coupling optical system 102, this beam is caused to form a line image long in main scanning direction by the line-image forming optical system 120, 121, then, is deflected by the light deflector 105 having the deflection reflective surface on or in the proximity of the imaging position of the line image, the deflected beam is condensed toward the surface 107 to be scanned by the scanning and imaging optical system 160, a beam spot is formed on the surface 107 to be scanned, and optical scanning of the surface 107 to be scanned is performed. This line-image forming optical system has a resin-made imaging mirror 120 an glass-made lens 121. The resin-made imaging mirror 120 has a surface having a negative power in main scanning direction and a larger negative power in sub-scanning direction. The powers of the surface of the resin-made imaging mirror 120 are set so that shift of image surface occurring due to temperature change of the scanning and imaging optical system 160 is effectively reduced.

The line-image forming optical system of the optical scanning device in the fifth embodiment described with reference to FIGS. 10A and 10B is a line-image forming optical system of an optical scanning device through which a beam from the light source 101 is transformed into a beam in a predetermined style (parallel beam) by the coupling optical system 102, this beam is caused to form a line image long in main scanning direction by the line-image forming optical system 130, 131, 132, then, is deflected by the light deflector 105 having the deflection reflective surface on or in the proximity of the imaging position of the line image, the deflected beam is condensed toward the surface 107 to be scanned by the scanning and imaging optical system 160, a beam spot is formed on the surface 107 to be scanned, and optical scanning of the surface 107 to be scanned is performed. This line-image forming optical system has one or a plurality of resin-made imaging mirror 130, one or a plurality of resin-made lens 131, and one or a plurality of glass-made lens 132. The resin-made imaging mirror 130 has a surface having a negative power at least in sub-scanning direction. The resin-made lens 131 has one or a plurality of surface(s) each having a negative power at least in sub-scanning direction. The system consisting of these resin-made imaging mirror 130 and resin-made lens 131 has at least one surface(s) (the surface of the resin-made imaging mirror) each having a negative power in main scanning direction. The power of each surface of the one or plurality of resin-made imaging mirror(s) and one or popularity of resin-made lens(es) is set so that shift of image surface occurring due to temperature change of the scanning and imaging optical system 160 is effectively reduced.

Further, the line-image forming optical system of the above-described specific example of the third embodiment has the two resin-made lenses 110, 111, and the glass-made lens 112. The two lenses 110 and 111 include the three surfaces (110*a*, 110*b*, 111*a*) each having the negative power in sub-scanning direction, and the surface (110*a*) having the negative power in main scanning direction. The power of each surface of the two resin-made lenses 110, 111 is set so that shift of image surface occurring due to temperature change of the resin-made optical component 106*b* included in the scanning and imaging optical system 160 is effectively reduced. The powers in sub-scanning direction of the surfaces (110*a*, 110*b* and 111*a*) each having the negative power in sub-scanning direction included in the resin-made lenses 110, 111 are set to be the same as each other.

The optical scanning device of each of the second, third, fourth and fifth embodiments described with reference to FIGS. 7A through 10B is an optical scanning device through which a beam in a predetermined style (parallel beam) from the side of the light source 101 is caused to form a line image long in main scanning direction by the line-image forming optical system 103, 104; 110, 111, 112; 120, 121; or 130, 131, 132, then, is deflected by the light deflector 105 having the deflection reflective surface on or in the proximity of the imaging position of the line image, the deflected beam is condensed toward the surface 107 to be scanned by the scanning and imaging optical system 160, a beam spot is formed on the surface 107 to be scanned, and optical scanning of the surface 107 to be scanned is performed. In this optical scanning device, the line-image forming optical system of one of those of the second, third, fourth and fifth embodiments is used. The scanning and imaging optical system 160 includes the resin-made optical component 106*b*, and the line-image forming optical system in the above-described specific example of the third embodiment may be used. Further, the scanning and imaging optical system is the fθ lens.

In each of the above-described second, third, fourth and fifth embodiments, shift of image surface occurring due to temperature change in the scanning and imaging optical system 160 is corrected by the line-image forming optical system. However, it is also possible to configure the line-image forming optical system so as to cause it to effectively reduce shift of image surface occurring due to temperature change of the coupling optical system or the coupling optical system and scanning and imaging optical system.

Each of the imaging adjustment methods described with reference to FIGS. 14 and 15 is an imaging adjustment method of performing deflected-beam imaging adjustment in the optical scanning device through which a beam in a predetermined style from the side of the light source 101 is caused to form a line image long in main scanning direction by the line-image forming optical system 110, 111, 112; or 130, 131, 132, then, is deflected by the light deflector 105 having the deflection reflective surface on or in the proximity of the imaging position of the line image, the deflected beam is condensed toward the surface 107 to be scanned by the scanning and imaging optical system 160, a beam spot is formed on the surface 107 to be scanned, and optical scanning of the surface 107 to be scanned is performed. The line-image forming optical system is configured to have the plurality of optical components 110, 111, 112; or 130, 131, 132, these optical components are configured to include the plurality of surfaces each having the negative power in sub-scanning direction and the surface having the negative power in main scanning direction, the positional relationship of the optical component having the surface having the negative power in main scanning direction and the other optical component having the surface having the negative power in sub-scanning direction with the scanning and imaging optical system is adjusted independently for the optical component 110 or 131 and the optical component 112 or 132. Thereby, the beam-waist positions in main scanning direction and sub-scanning direction are adjusted with respect to the position of the surface to be scanned. Imaging adjustment in accordance with the above-described imaging adjustment method may be performed in the optical scanning device in each of the second, third, fourth and fifth embodiments. Then, each optical component of the line-image forming optical system is fixed.

Making reference to FIG. 17, an embodiment of an image forming apparatus according to the present invention will now be described.

This image forming apparatus is a laser printer.

The laser printer 1100 has a 'cylindrical photoconductive photosensitive body' as an image carrying body 1111.

Around the image carrying body 1111, a charging roller 1112 as a charging unit, a developing unit 1113, a transfer roller 1114 and a cleaning unit 1115 are arranged. It is possible to use a 'corona charger' as the charging unit. Further, an optical scanning device 1117 is provided, which performs 'exposure by optical writing using a laser beam LB', between the charging roller 1112 and developing unit 1113.

The optical scanning device 1117 is such as the above-mentioned second, third, fourth or fifth embodiment. The optical scanning device 1117 performs exposure through optical writing using a laser beam LB between the charging roller 1112 and developing unit 1113.

Figure 17:
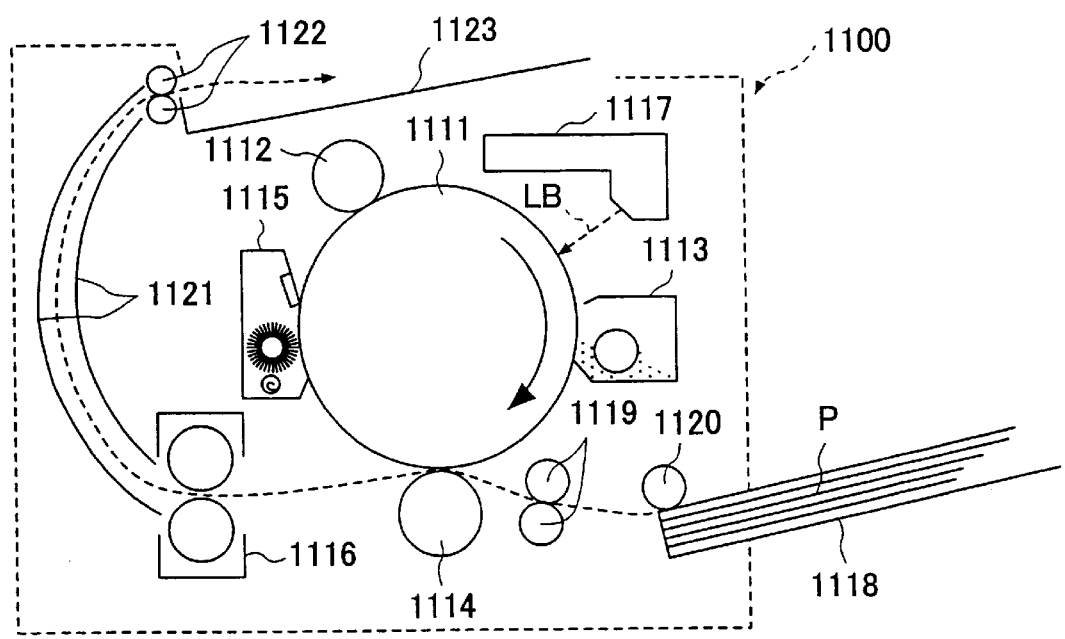
FIG. 17 illustrates an example of configuration of an image forming apertures according to the present invention.

Further, as shown in FIG. 17, a fixing unit 1116, a cassette 1118, a pair of registration rollers 1119, a paper feeding roller 1120, a conveyance path 1121, a pair of paper ejecting rollers 1122, and a tray 1123 are provided. In the tray 1123, transfer paper P as recording media is contained.

When a printed image is formed, the image carrying body 1111 which is the photoconductive photosensitive body is rotated at a uniform velocity clockwise, a surface thereof is charged uniformly by the charging roller 1112, and an electrostatic latent image is formed thereon by exposure through optical writing using the laser beam LB performed by the optical scanning device 1117. The thus-formed electrostatic latent image is a so-called 'negative latent image' and in which an image portion is exposed.

The electrostatic latent image is developed by the developing unit 1113 so that a toner image (positive image) is formed on the image carrying body 1111.

The cassette 1118 containing the transfer paper P is detachable from a body of the laser printer 1100, and, in a condition in which the cassette 1118 is attached to the body as shown in the figure, a top sheet of the transfer paper contained thereby is fed by the paper feeding roller 1120. The thus-fed transfer-paper sheet is taken by the pair of the registration rollers 1119 at the front end thereof. The pair of registration rollers 1119 feed the transfer-paper sheet to the transfer roller 1114 at a time at which the toner image on the image carrying body 1111 moves to the transfer roller 1114 due to rotation of the carrying body 1111. The thus-fed transfer-paper sheet P is laid on the toner image at the transfer roller 1114 and, by a function of the transfer roller 1114, the toner image is electrostatically transferred onto the transfer-paper sheet. The transfer-paper sheet P having the toner image transferred thereonto has the toner image fixed thereonto by the fixing unit 1116, then, passes through the conveyance path 1121, and is ejected onto the tray 1123 by the pair of paper ejecting rollers 1122. After the toner image is transferred to the transfer-paper sheet, the surface of the image carrying body 1111 is cleaned by the cleaning unit 1115, and, thus, residual toner, paper powder and so forth are removed therefrom.

Instead of the transfer-paper sheet, the above-described OHP sheet or the like may be used. Further, transfer of toner image may be performed through an intermediate transfer medium such as an intermediate transfer belt. By employing such a device as the optical scanning device in each of the second, third, fourth and fifth embodiments as the optical scanning device 1117 of the laser printer, it is possible to perform image formation satisfactorily.

Thus, the image forming apparatus shown in FIG. 17 is an apparatus in which an electrostatic latent image is formed on the latent-image carrying body 1111 by optical scanning, the thus-formed electrostatic latent image is developed so as to be visualized, and, thereby, a desired recorded (printed) image is obtained. In the image forming apparatus, as the optical scanning device 1117 for performing the optical scanning of the latent-image carrying body 1111, any of the above-mentioned optical scanning devices in the second, third, fourth and fifth embodiments is used. The image forming apparatus is such that the photoconductive photosensitive body is used as the latent-image carrying body 1111, an electrostatic latent image is formed thereon through uniform charging and optical scanning thereof, the thus-formed electrostatic latent image is visualized as a toner image, the toner image is transferred and fixed onto the sheet-like recording medium P.

The present invention is not limited to the above-described embodiments, and variations and modifications may be made without departing from the scope of the present invention.

The present application is based on Japanese priority applications Nos. 11-247540 and 2000-119609, filed on Sep. 1, 1999 and Apr. 20, 2000, respectively, the entire contents of which are hereby incorporated by reference.

What is claimed is:

1. A line-image forming optical system of an optical scanning device through which a beam from the light source is transformed into a beam in a predetermined style by a coupling optical system, the beam is caused to form a line image long in main scanning direction by the line-image forming optical system, then, is deflected by a light deflector having a deflection reflective surface on or in the proximity of the imaging position of the line image, the deflected beam is condensed toward a surface to be scanned by a scanning and imaging optical system, a beam spot is formed on the surface to be scanned, and optical scanning of the surface to be scanned is performed, wherein:
    said line-image forming optical system comprises at least one resin-made imaging mirror and at least one glass-made lens;
    said at least one resin-made imaging mirror has at least one surface having a negative power in main scanning direction and a larger negative power in sub-scanning direction; and
    the powers of respective surfaces of said at least one resin-made imaging mirror are set so that shift of image surface occurring due to temperature change of the coupling optical system and/or scanning and imaging optical system is effectively reduced.

2. The line-image forming optical system as claimed in claim 1, wherein the powers in sub-scanning direction of the surfaces each having the negative power in sub-scanning direction included in the resin-made optical component(s) are set to be approximately the same as each other.

3. An optical scanning device through which a beam in a predetermined style from a side of a light source is caused to form a line image long in main scanning direction by a line-image forming optical system, then, is deflected by a light deflector having a deflection reflective surface on or in the proximity of the imaging position of the line image, the deflected beam is condensed toward a surface to be scanned by a scanning and imaging optical system, a beam spot is formed on the surface to be scanned, and optical scanning of the surface to be scanned is performed, wherein said line-image forming optical system comprises the line-image forming optical system as claimed in claim 1.

4. An image forming apparatus in which a latent image is formed on a photosensitive surface of photosensitive medium as a result of said photosensitive surface being optically scanned by an optical scanning device, is visualized, and, thus, an image is obtained, wherein said optical scanning device comprises the optical scanning device as claimed in claim 3.

5. The image forming apparatus as claimed in claim 4, wherein said photosensitive medium comprises a photoconductive photosensitive body, and an electrostatic latent image formed as a result of said photosensitive body being uniformly charged and optically scanned by said optical scanning device is visualized to a toner image.

6. A line-image forming optical system of an optical scanning device through which a beam from the light source is transformed into a beam in a predetermined style by a coupling optical system, the beam is caused to form a line image long in main scanning direction by the line-image forming optical system, then, is deflected by a light deflector having a deflection reflective surface on or in the proximity of the imaging position of the line image, the deflected beam is condensed toward a surface to be scanned by a scanning and imaging optical system, a beam spot is formed on the surface to be scanned, and optical scanning of the surface to be scanned is performed, wherein:
said line-image forming optical system comprises at least one resin-made imaging mirror, at least one resin-made lens, and at least one glass-made lens;
said at least one resin-made imaging mirror has at least one surface having a negative power at least in sub-scanning direction;
said at least one resin-made lens has at least one surface having a negative power at least in sub-scanning direction;
a system consisting of these resin-made imaging mirror and resin-made lens has at least one surface having a negative power in main scanning direction; and
the powers of respective surfaces of at least one resin-made imaging mirror and at least one resin-made lens are set so that shift of image surface occurring due to temperature change of the coupling optical system and/or scanning and imaging optical system is effectively reduced.

7. The line-image forming optical system as claimed in claim 6, wherein the powers in sub-scanning direction of the surfaces each having the negative power in sub-scanning direction included in the resin-made optical components are set to be approximately the same as each other.

8. An optical scanning device through which a beam in a predetermined style from a side of a light source is caused to form a line image long in main scanning direction by a line-image forming optical system, then, is deflected by a light deflector having a deflection reflective surface on or in the proximity of the imaging position of the line image, the deflected beam is condensed toward a surface to be scanned by a scanning and imaging optical system, a beam spot is formed on the surface to be scanned, and optical scanning of the surface to be scanned is performed, wherein said line-image forming optical system comprises the line-image forming optical system as claimed in claim 6.

9. An image forming apparatus in which a latent image is formed on a photosensitive surface of photosensitive medium as a result of said photosensitive surface being optically scanned by an optical scanning device, is visualized, and, thus, an image is obtained, wherein said optical scanning device comprises the optical scanning device as claimed in claim 8.

10. The image forming apparatus as claimed in claim 9, wherein said photosensitive medium comprises a photoconductive photosensitive body, and an electrostatic latent image formed as a result of said photosensitive body being uniformly charged and optically scanned by said optical scanning device is visualized to a toner image.

* * * * *